US008239609B2

(12) United States Patent
Hudzia et al.

(10) Patent No.: US 8,239,609 B2
(45) Date of Patent: Aug. 7, 2012

(54) LEVERAGING MEMORY SIMILARITY DURING LIVE MIGRATIONS

(75) Inventors: Benoit Hudzia, Belfast (GB); Stuart Hacking, Huntingdale Grande (GB)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 12/605,283

(22) Filed: Oct. 23, 2009

(65) Prior Publication Data

US 2011/0099318 A1    Apr. 28, 2011

(51) Int. Cl.
    *G06F 13/00* (2006.01)
(52) U.S. Cl. .................................. 711/6; 718/1; 709/230
(58) Field of Classification Search ........................ None
    See application file for complete search history.

(56) References Cited

U.S. PATENT DOCUMENTS 5,493,663 A * 2/1996 Parikh ........................... 711/159
2009/0204718 A1* 8/2009 Lawton et al. ................. 709/230

OTHER PUBLICATIONS

"VMware Storage vMotion—Non-Disruptive Live Migration for Virtual Machine Storage Disk Files", VMware, Inc. Product Datasheet (2007), 2 pages.
Bradford, Robert, et al, "Live Wide-Area Migration of Virtual Machines Including Local Persistent State", in VEE '07 (Jun. 13-15, 2007), 11 pages.
Clark, Christopher, et al, "Live Migration of Virtual Machines", In Proceedings of the 2nd ACM/USENIX Symposium on Networked Systems Design and Implementation (May 2005), 14 pages.
Gupta, Diwaker, et al, "Difference Engine: Harnessing Memory Redundancy in Virtual Machines", In 8th USENIX Symposium on Operating System Design and Implementation (Dec. 2008), 14 pages.
Gupta, Diwaker, "Scalable Virtual Machine Multiplexing", Dissertation, University of California (Apr. 6, 2009), 96 pages.
Harney, Eric, et al, "The Efficacy of Live Virtual Machine Migrations Over the Internet", in VTDC '07 (Nov. 12, 2007), 7 pages.
Hines, Michael R., et al, "Post-Copy Based Live Virtual Machine Migration Using Adaptive Pre-Paging and Dynamic Self-Ballooning", in VEE '09 (Mar. 11-13, 2009), 10 pages.
Liu, Pengcheng, et al, "Heterogeneous Live Migration of Virtual Machines", In International Workshop on Virtualization Technology (Jun. 21, 2008), 9 pages.
Milos, Grzegorz, et al, "Satori: Enlightened Page Sharing", in USENIX Annual Technical Conference (Jun. 14-19, 2009), 14 pages.
Ramakrishnan, K.K., et al, "Live Data Center Migration across WANs: A Robust Cooperative Context Aware Approach", in INM '07 (Aug. 27-31, 2007), 6 pages.

(Continued)

*Primary Examiner* — Jared Rutz
*Assistant Examiner* — Alan Otto
(74) *Attorney, Agent, or Firm* — Brake Hughes Bellermann LLP

(57) ABSTRACT

A page scanner may be configured to identify, during a live migration of a virtual machine including a transfer of a plurality of memory pages from source hardware resources to destination hardware resources, a candidate memory page of the plurality of memory pages to include in the transfer while at least one operation of the virtual machine continues to execute. A fingerprint comparator may be configured to compare a candidate page fingerprint of the candidate memory page to existing page fingerprints of existing memory pages stored using the second hardware resources, and further configured to determine, based on the comparing, that a duplicate of the candidate page is included within the existing memory pages. A duplicate page handler may be configured to facilitate continued execution of the virtual machine using the duplicate of the candidate page and the second hardware resources.

18 Claims, 10 Drawing Sheets

OTHER PUBLICATIONS

Sapuntzakis, Constantine P., et al, "Optimizing the Migration of Virtual Computers", In Proceedings of the 5th Symposium on Operating Systems Design and Implementation (Dec. 2002), 14 pages.

Travostino, Franco, et al, "Seamless Live Migration of Virtual Machines over the MAN/WAN", Elsevier Future Generation Computer Systems (Nov. 11-17, 2006), 10 pages.

Waldspurger, Carl, "Memory Resource Management in WMware ESX Server", In Proceedings of the 5th Symposium on Operating System Design and Implementation, OSDI '02 Presentation (Dec. 10, 2002), 24 pages.

Wood, Timothy, et al, "Memory Buddies: Exploiting Page Sharing for Smart Colocation in Virtualized Data Centers", in VEE '09 (Mar. 11-13, 2009), 10 pages.

Zhao, Ming, et al "Experimental Study of Virtual Machine Migration in Support of Reservation of Cluster Resources", Proceedings of the 3rd International Workshop on Virtualization Technology in Distributed Computing (Nov. 12, 2007), 8 pages.

Extended EP Search Report for EP Application No. 10013782.7, mailed Mar. 11, 2011, 12 pages.

Stultz, "Optimizing Live Virtual Machine Migrations using Content-Based Page hashes", Nov. 13, 2008, 56 pages.

Riteau, et al, "Shrinker: Efficient Wide-Area Live Virtual Machine Migration Using Distributed Content-Based Addressing", INRIA, Inria-00454727, version 1, Feb. 9, 2010, 22 pages.

"Bloom Filter", Wikipedia, the free encyclopedia, Jun. 17, 2009, 10 pages.

Henson, et al, "Guidelines for Using Compare-by-hash", Dec. 14, 2005, 14 pages.

* cited by examiner

LEVERAGING MEMORY SIMILARITY DURING LIVE MIGRATIONS

TECHNICAL FIELD

This description relates to live migrations of virtual machines.

BACKGROUND

The virtual computer or virtual machine generally refers to a software construct which is designed to mimic, and provide the functionality of, an independent, discrete, and/or physical computer (or portion thereof). Techniques and technology for providing such virtual machines may be referred to as virtualization, and are generally used to provide users with a computing experience which is virtually indistinguishable from that of using an actual computer.

For example, virtualization technology may be used to create one or more such virtual machines, implemented using one or more underlying hardware platforms. For example, a physical/hardware server may be equipped with a certain amount of processing power and memory resources. Virtualization technology may be used to create a virtual machine to be executed by the server computer, where the virtual machine may be allocated some or all of the available processing power and memory resources of the underlying physical server. As is well-known, and as just referenced, the resulting virtual machine may be operated as if it were itself a unique and independent physical computing device. For example, the virtual machine may be associated with and/or may execute its own network address, operating system, and other characteristics traditionally thought of as having a one-to-one relationship with an actual physical computer.

Such virtual machines are known to provide a number of advantages and benefits. For example, such virtual machines may offer a flexibility and ease of use not typically available when using traditionally physical computers. For example, as referenced above, a virtual machine is generally allocated some or all of the available computing resources of the underlying physical hardware, e.g., processing power and memory resources. Thus, such resource allocations for a particular virtual machine may be increased or decreased on an as-needed basis, so that a user of the virtual machine may be provided with an amount of computing ability which is matched to a current need for ability of the user. Consequently, as the computing needs of the user change over time, the virtual machine may be altered in a corresponding manner, so that computing resources may be provided to the user in a cost-effective manner.

In virtualization technology, a program known as a hypervisor may be used to administer or otherwise manage the characteristics and features of one or more virtual machines. That is, either the underlying physical hardware of the virtual machine, or some other computing resource, may be used to implement the hypervisor, so that a user of the hypervisor may alter the characteristics and features of the virtual machine in a desired manner. For example, such a user of the hypervisor may include a network administrator or other administrator in charge of providing one or more virtual machines to one or more customers or other users. In this case, the various customers or other users may experience changes in their computing needs, so that the administrator may use the hypervisor to correspondingly raise, lower, or otherwise modify computing resources allocated to each virtual machine of each customer or other user.

One particular use of such a hypervisor is known as virtual machine migration, in which a virtual machine is migrated or transferred from source hardware resources to destination hardware resources. For example, as referenced above, it may occur that a user of a virtual machine may experience a temporary or long-term increase in their computing needs. In such a case, it may occur that the underlying hardware resources of the virtual machine may be insufficient to meet the desired increase in resources allocated to the virtual machine. Various other reasons may motivate such migrations of a virtual machine from one platform of hardware resources to another, as is known. For example, there may be a need to take a current platform of hardware resources offline, e.g., for maintenance or upgrade. In other examples, such migrations may occur when a provider of the virtual machine obtains new hardware resources which are better-suited to execute the virtual machine.

One technique for executing a migration of a virtual machine is to ensure that all operations of the virtual machine have been stopped, and then to copy or otherwise transfer the virtual machine from the first platform of hardware resources to the second platform of hardware resources. Such a solution, however, may not always be practical or desirable. For example, the virtual machine may currently be in use by a user(s). In particular, it may occur that the virtual machine is deployed to many users, e.g., users within an enterprise or other organization. In such cases, the virtual machine is in essentially constant use, and therefore any stoppage of the virtual machine may represent an undesirable or unacceptable inconvenience for the users. In such cases, the virtual machine may undergo a live migration, in which use of the virtual machine continues largely uninterrupted throughout the migration process.

For example, if a virtual machine is actively providing one or more applications to one or more users, a hypervisor of the virtual machine may be used to initiate a live migration of the virtual machine from its current/source hardware resources to destination hardware resources. The hypervisor may coordinate the transfer of running applications and other aspects of the virtual machine from the source hardware resources to the destination hardware resources. During the time of the transfer, the users of the applications may have no awareness that the applications and virtual machine are in the process of being transferred. For example, the hypervisor may ensure that the source hardware resources continue to provide functionality associated with remaining portions of the virtual machine still stored thereon, while ensuring that already-transferred portions of the virtual machines at the destination hardware resources begin immediately to provide their associated functionality. In this way, use of the virtual machine may continue on a virtually-uninterrupted basis throughout the migration.

In practice, however, it may be difficult to achieve the goal of continuous (or near-continuous) operation of the virtual machine during a live migration. For example, the virtual machine may be very large, e.g., in terms of memory resources, and/or may be frequently accessed by a relatively large number of users. In these and other scenarios, it is difficult to execute a live migration of the virtual machine, without requiring an undesirable or unacceptable level of stoppage or unavailability of the virtual machine during some portion(s) of the migration.

SUMMARY

According to one general aspect, a system may include instructions recorded on a computer-readable medium. The system may include a page scanner configured to identify, during a live migration of a virtual machine including a transfer of a plurality of memory pages from source hardware resources to destination hardware resources, a candidate memory page of the plurality of memory pages to include in the transfer while at least one operation of the virtual machine continues to execute. The system may include a fingerprint comparator configured to compare a candidate page fingerprint of the candidate memory page to existing page fingerprints of existing memory pages stored using the second hardware resources, and further configured to determine, based on the comparing, that a duplicate of the candidate page is included within the existing memory pages. The system may include a duplicate page handler configured to facilitate continued execution of the virtual machine using the duplicate of the candidate page and the second hardware resources.

According to another general aspect, a computer-implemented method may include executing a live migration of a virtual machine including a plurality of memory pages from source hardware resources to destination hardware resources, the live migration including transfer of the virtual machine from the source hardware resources to the destination hardware resources while continuing to execute at least one operation of the virtual machine. The computer-implemented method may include identifying a candidate memory page of the plurality of memory pages to include in the transfer, comparing a candidate page fingerprint of the candidate memory page to existing page fingerprints of existing memory pages stored using the second hardware resources, determining, based on the comparing, that a duplicate of the candidate page is included within the existing memory pages, and executing the virtual machine using the duplicate of the candidate page and the second hardware resources.

According to another general aspect, a computer program product may be tangibly embodied on a computer-readable medium and may include instructions that, when executed, are configured to identify, during a live migration of a virtual machine including a transfer of a plurality of memory pages from source hardware resources to destination hardware resources, a candidate memory page of the plurality of memory pages to include in the transfer while at least one operation of the virtual machine continues to execute, compare a candidate page fingerprint of the candidate memory page to existing page fingerprints of existing memory pages stored using the second hardware resources, and determine, based on the comparing, that a duplicate of the candidate page is included within the existing memory pages, and facilitate continued execution of the virtual machine using the duplicate of the candidate page and the second hardware resources.

The details of one or more implementations are set forth in the accompanying drawings and the description below. Other features will be apparent from the description and drawings, and from the claims.

DETAILED DESCRIPTION

Figure 1:
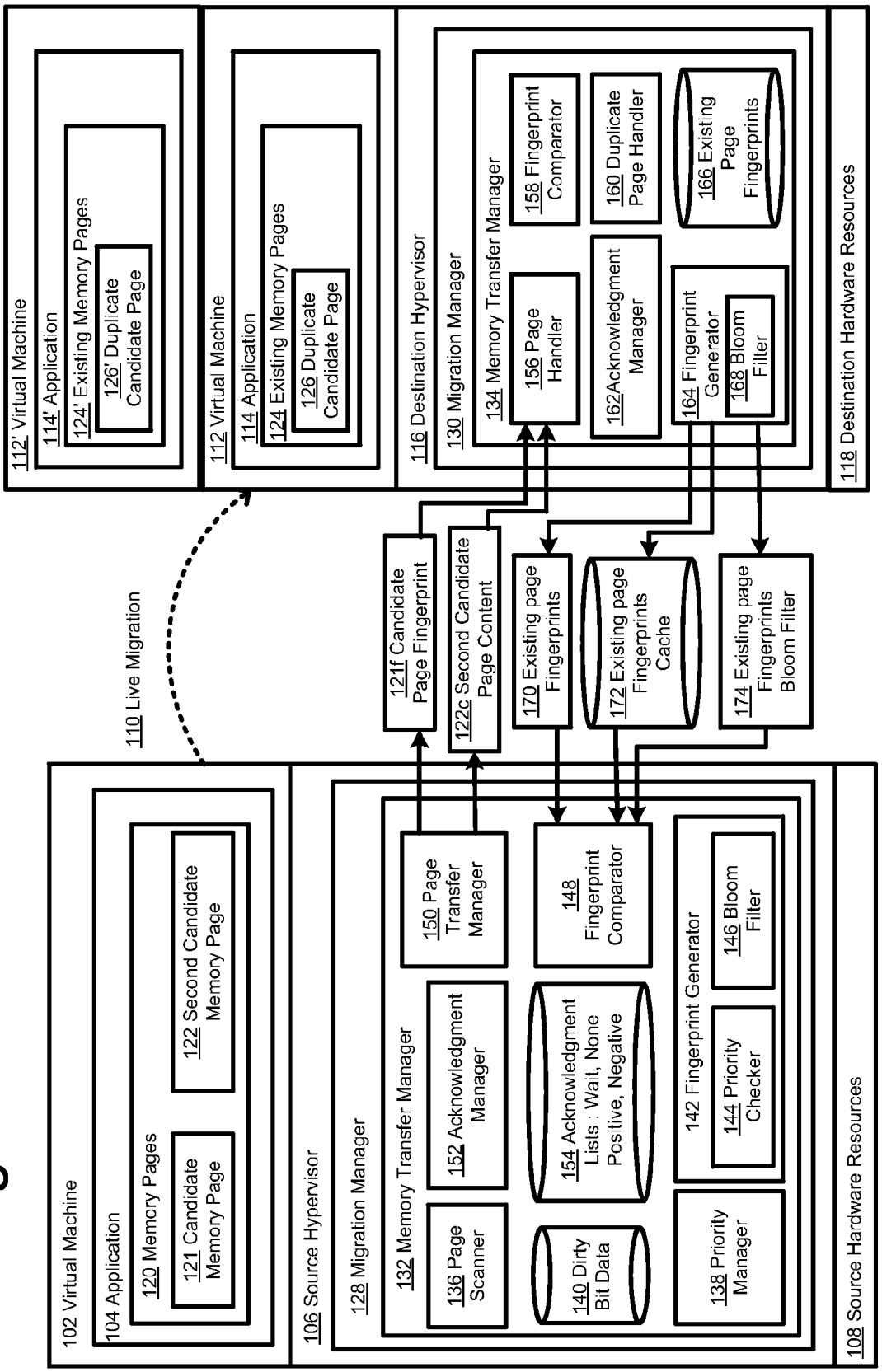
FIG. 1 is a block diagram of a system 100 for executing a live migration of a virtual machine.

FIG. 1 is a block diagram of a system 100 for executing a live migration of a virtual machine 102. In the example of FIG. 1, the virtual machine 102 is illustrated as executing an application 104 under supervision of a source hypervisor 106. As shown, the virtual machine 102, the application 104, and the source hypervisor 106 all may be executed using underlying source hardware resources 108.

At a specified or desired point in time, a live migration 110 may occur during which the virtual machine 102 is transferred from the source hardware resources 108 to be executed as virtual machine 112. As will be appreciated, the virtual machine 112 will be essentially identical to the transferred virtual machine 102, and therefore, for example, may execute an application 114, which is essentially identical to the application 104. A destination hypervisor 116, along with the virtual machine 112, may be executed using destination hardware resources 118, as shown.

As referenced above, during the live migration 110, it is desirable that any user of the virtual machine 102 should experience little or no disruption in their use thereof, as the virtual machine 102 is transferred for execution as the virtual machine 112. In particular, a user may currently be executing the application 104 of the virtual machine 102, where the application 104 may include a plurality of memory pages 120.

In this regard, it may be appreciated that the virtual machine 102 may represent virtually any virtual machine or other software construct suitable for undergoing the live migration 110. As such, the application 104 also may represent virtually any conventional or known application which may be executed using the virtual machine 102. In the example of FIG. 1, the application 104 is illustrated as including, or otherwise being associated with, the plurality of memory pages 120, which thus also represent known or conventional uses and characteristics of memory pages. Accordingly, the virtual machine 102, the application 104, and the memory pages 120 are not discussed herein in detail, other than as may be needed or useful to assist in understanding operations of the system 100 of FIG. 1.

In particular, it may be appreciated that during operation of the application 104, the memory pages 120 may be updated or otherwise changed with varying frequencies and/or to varying extents. For example, the application 104 may represent a word processing application, so that the memory pages 120 may represent various documents associated with the word processing application. In this case, every time a user of the word processing application updates or otherwise changes a particular document, one or more corresponding memory pages may also be updated or changed. In another example, the application 104 may represent a customer relationship management (CRM) system, in which an enterprise seeks to track, leverage, or otherwise manage their customer data. In this case, the memory pages 120 may be associated with corresponding customers or customer accounts, so that updates to customer information may result in corresponding changes to the memory pages 120.

In a more particular example, as referenced above, it may occur that the virtual machine 102 is deployed in an enterprise setting, or in another setting in which the virtual machine 102 is desired or required to provide a relatively large amount of computing resources, e.g., to a relatively large user base. For example, the source hardware resources 108 may represent a platform of hardware resources which provide a relatively large amount of processing power and/or memory resources to the virtual machine 102.

As with the virtual machine 102 itself, the source hardware resources 108 may be understood in general to represent conventional hardware resources, and, as such, are also not described herein detail other than as may be needed or helpful in understanding operations of the system 100 of FIG. 1. In general, though, as referenced above, it may be appreciated that the source hardware resources 108 may represent a relatively large amount of computing resources, some or all of which may be designated and allocated for providing the virtual machine 102. In a particular example, the source hardware resources 108 may include memory resources including a relatively large amount of random access memory (RAM). As will be appreciated, such memory resources (including the provided RAM) may provide the underlying hardware basis for memory allocated to the virtual machine 102, including an amount of virtual memory (virtual RAM) used to store and access the memory pages 120.

In such scenarios, and other scenarios, it may occur that a large number of users frequently access the memory pages 120 during the normal course of usage of the application 104. As is known, in general, the source hypervisor 106 and/or the destination hypervisor 116 may coordinate the live migration 110, including transfer of the memory pages 120.

For example, the hypervisor(s) 106, 116 may individually scan or otherwise access or request individual memory pages from the memory pages 120, examples of which are shown in FIG. 1 as a candidate memory page 121 and a second candidate memory page 122. Of course, an actual number of such candidate pages of the application 104 may number, e.g., in the thousands or millions.

For each candidate memory page, a decision may be made as to whether and how to transfer the candidate memory page from the application 104 to the application 114. In an ideal scenario, the live migration 110 would include sequential transfer of each candidate memory page, e.g., in consecutive order or on an as-selected basis, until all of the memory pages 120 are transferred to the application 114.

In practice, however, the fact that the application 104 is in current use generally precludes the possibility of such an ideal or simplistic transfer. In particular, for example, it may occur that the live migration 110 initially includes transfer of the candidate memory page 121 from the application 104 to the application 114, and may continue with examination and ultimate transfer of the second candidate memory page 122 and any other subsequent memory pages of the memory pages 120. During such examination and transfer of subsequent pages, however, it may occur that the candidate memory page 121 is updated or otherwise altered, e.g., by the user of the application 104. In this case, it may occur that the updated or otherwise changed candidate memory page 121 would then have to be re-transferred from the application 104 to the application 114.

When such a memory page is altered subsequent to its transfer as part of the live migration 110, so that re-transfer of the altered memory page is generally required, then the altered memory page may be referred to as a "dirty page." In some cases, the dirtying of such already-transferred memory pages through updating or other alterations thereof may not represent a significant difficulty for executing the live migration 110. For example, it may be possible to execute a first scan/transfer iteration in which each of the memory pages 120 is transferred from the application 104 to the application 114. Then, a second scan/transfer iteration may be executed in which any of the memory pages 120 which have been dirtied or otherwise altered subsequent to their transfer but prior to completion of the first transfer iteration may be scanned and ultimately re-transferred to the application 114. Such transfer iterations may continue, presumably with ever-smaller sets of remaining candidate memory pages of the memory pages 120, until all of the memory pages 120 have been transferred.

Such techniques may be feasible, for example, when an overall number of the memory pages 120 is relatively small, and/or when updates or other changes to the memory pages 120 are relatively infrequent. In such cases, a number of dirty pages requiring re-transmission during each consecutive transfer iteration will generally become smaller and smaller, so that the time between transfer iterations also become smaller and smaller, and, consequently, it becomes less likely that memory pages will be dirtied prior to completion of the live migration 110. Then, retransmission of dirtied pages is not required, and eventually all the memory pages 120 may successfully be transferred.

In practice, however, such transfer scenarios may become impractical or impossible. For example, if a number of memory pages 120 and/or a frequency of dirtying thereof becomes sufficiently high, then it may become difficult or impossible to complete the live migration 110 before additional memory pages are dirtied and require retransmission. In such cases, the live migration may be completed by forcibly stopping all operations of the virtual machine 102 (including use of the application 104), whereupon the copying or other transfer of any remaining, frozen pages of the memory pages 120 may be completed so that such remaining pages may be transferred together to the application 114, thereby completing the live migration 110.

Such stoppage of the virtual machine 102 (sometimes referred to as "stop-and-copy"), as referenced above, is generally undesirable or unacceptable during many examples of the live migration 110, particularly when the stoppage is lengthy. For example, as referenced, there may be many tens or hundreds of users of the virtual machine 102, so that any stoppage of the virtual machine 102 may result in an unacceptable loss of human resources or profit margins. In other examples, the virtual machine 102 may be used to execute time-sensitive operations, including operations in which constant and/or timely availability of the virtual machine 102 is required. For example, such operations may be found in hospitals or other clinical environments in which patients must receive a constant level of care.

As may be appreciated, as a size of the virtual machine 102 increases, a quantity of the source hardware resources 108 (e.g., RAM or other memory resources) may generally grow as well, and, further, a number of users and/or frequency of access of the application 104 may increase as well. These and other factors may thus contribute to a relatively large and rapid rate of dirtying of the memory pages 120. Consequently, it may become difficult or impossible to complete the live migration 110 without requiring a non-trivial stoppage of the virtual machine. Moreover, such a stoppage for a large instance of the virtual machine 102 may be particularly long, e.g., such as when a large number of the memory pages 120 are dirtied at a high rate which effectively prohibits their transfer during the live migration 110.

Thus, in order to execute the live migration 110 in these and other scenarios, the system 100 of FIG. 1 may be configured to improve or optimize a process by which the memory pages 120 are transferred from the application 104 to the application 114. For example, the system 100 of FIG. 1 may be configured to leverage availability of existing memory pages 124 which are already stored by the destination hardware resources 118, e.g., already stored on the virtual machine 112, or otherwise locally stored or available as described in more detail, below.

More particularly, for a particular candidate page to be transferred (such as the candidate page 121), the system 100 of FIG. 1 may be configured to determine that the existing memory pages 124 include a duplicate candidate page 126, which is the same or essentially the same as the candidate page to be transferred (e.g., the candidate memory page 121). Then, during execution of the live migration 110, the system 100 may avoid transferring an entirety of the contents of the candidate memory page 121, and may instead transfer a smaller amount of information which represents or otherwise references the candidate memory page 121. Then, the duplicate candidate page 126 may be used in place of the candidate memory page 121 by the application 114.

In this way, an amount of data required to be transferred within the live migration 110 may be reduced, so that the live migration 110 may proceed at a substantially faster rate. Consequently, even when a dirtying rate of the memory pages 120 is high, and/or when a number of the memory pages 120 is large, the system 100 may operate to execute the live migration 110 with little or no stoppage of the virtual machine 102/112.

In example implementations, the source hypervisor 106 may include a migration manager 128 that is configured to supervise, administer, or otherwise execute the live migration 110. Additionally, or alternatively, the destination hypervisor 116 may include a migration manager 130 which may execute, or assist in the execution of, the live migration 110. In other words, as described in more detail below, either or both of the source hypervisor 106 and the destination hypervisor 116 may participate in the active execution of the live migration 110. In other example implementations, the first hypervisor 106 and the destination hypervisor 116 may coordinate with one another to varying extents to execute the live migration 110.

In example implementations, the migration manager 130 of the destination hypervisor 116 may be configured to provide or otherwise utilize information about existing memory pages 124 which are already or currently available at the destination hardware resources 118, as described in more detail below. As also described in more detail below, the migration manager 130 may use one or more of a number of techniques for providing or otherwise utilizing information about the existing memory pages 124.

In general, however, it may be appreciated that the migration manager 130 enables leveraging of the information regarding the existing memory pages 124, so that in the event that one of the memory pages 120 to be transferred (e.g., the candidate memory page 121 or the second candidate memory page 122) already has a substantial duplicate thereof available at the destination hardware resources 118 (e.g., the duplicate memory page 126), then the need to transfer the content of any such duplicated candidate memory pages may be substantially reduced or eliminated. Instead, as described herein, the identified duplicate candidate page (126) may be copied, linked, or otherwise utilized to substitute for an actual transfer of the entirety of the contents of the identified candidate page (121) within the memory pages 120. In this way, an overall speed and duration of the live migration 110 may be improved, while requiring fewer resources to transfer the memory pages 120.

As referenced above, various types of virtual machine migration are known and understood within the art, so that it may be appreciated that conventional migration managers are also well known in the art. Consequently, various functions of migration managers 128, 130 may not be described here in detail, other than as may be necessary to understand operations of the system 100 and related operations.

For example, conventional migration managers may be understood to include various techniques for executing memory transfer of memory pages, such as the memory pages 120. In this regard, such conventional migration managers may be understood to include a memory transfer manager which is tasked specifically with executing transfer of such memory pages. In the system 100 of FIG. 1, a memory transfer manager 132 is illustrated within the migration manager 128 of the source hypervisor 106. Similarly, a memory transfer manager 134 is illustrated within the migration manager 130 of the destination hypervisor 116. Again, various conventional aspects of memory transfer managers are not necessarily described herein, except as otherwise needed to understand functionality of the system 100.

In example operations, a live migration 110 may commence at a particular time when the memory pages 120 are in an initial state. Various preparatory actions may be taken as part of commencing the live migration 110, examples of which are described in more detail below with respect to FIGS. 8 and 9, whereupon transfer of the memory pages 120 may begin.

For example, a page scanner 136 may be configured to begin scanning the memory pages 120 in sequential order to identify candidate memory pages for potential transfer to the destination virtual machine 112. In example implementations, the page scanner 136 may simply consecutively select and scan each of the memory pages 120. However, as referenced above, in various circumstances and settings, the number of the memory pages 120 may be relatively large, so that, for example, the memory pages 120 may number in the thousands or millions. In such cases, and in other cases, it may be impractical or undesirable for the page scanner simply to scan each of the memory pages 120 in turn.

Consequently, in the example of FIG. 1, a priority manager 138 may be configured to designate pages or sets of memory pages within memory pages 120 which should be scanned by the page scanner sooner and/or more frequently. Example implementations of the priority manager 138 are described in more detail below, e.g., with respect to FIGS. 3A and 3B.

In general, however, the priority manager 138 may be configured to assign or associate a priority to each page (or set or group of pages) of the memory pages 120. For example, each memory page of the memory pages 120 may be assigned a priority based on how frequently and/or recently the memory page has been dirtied or otherwise altered. That is, the priority manager 138 may be configured to designate memory pages which are not changed frequently or recently as having a high priority for transfer as part of the live migration 110. Conversely, the priority manager 138 may be configured to designate memory pages which do exhibit frequent and/or recent alterations as being low priority for immediate transfer within the live migration 110.

The priority manager 138 thus assists in recognizing and taking advantage of the fact that there may be little or no benefit in transferring a memory page which is likely to be dirtied in the relatively near future, since such a transfer is therefore likely to require repeating after a subsequent alteration of the memory page in question. In other words, the more a memory page of the memory pages 120 is accessed and altered by a user of the application 104 during the live migration, the more likely it becomes that such a memory page will need to be retransferred in its new/altered state in order to maintain a completeness and accuracy of the live migration 110.

In conventional systems, a dirty page tracker may be used to determine whether a given memory page has been altered since its most recent transfer. In this way, a determination may be made as to whether re-transfer is necessary during a subsequent scanning/transfer iteration. In example implementations, as described in more detail below, e.g., with respect to FIGS. 3A and 3B, the priority manager 138 may include and/or use such a conventional dirty page tracker to assign transfer priority levels in association with assigning a value for a "dirty bit" associated with each memory page (or set of memory pages) within the memory pages 120, based, e.g., on whether the associated memory page has been dirtied since its most recent transfer.

Figure 3A:
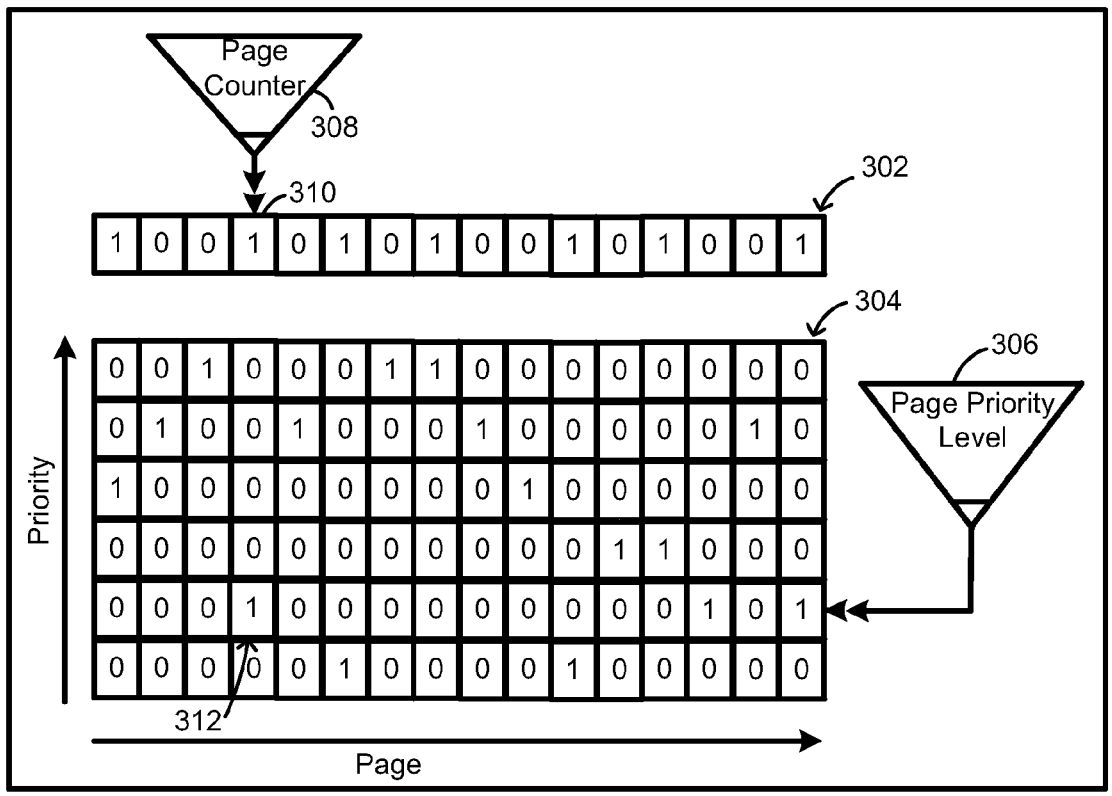
FIGS. 3A and 3B are block diagrams illustrating a memory page priority scheme for use in executing the system of FIG. 1.
Figure 3B:
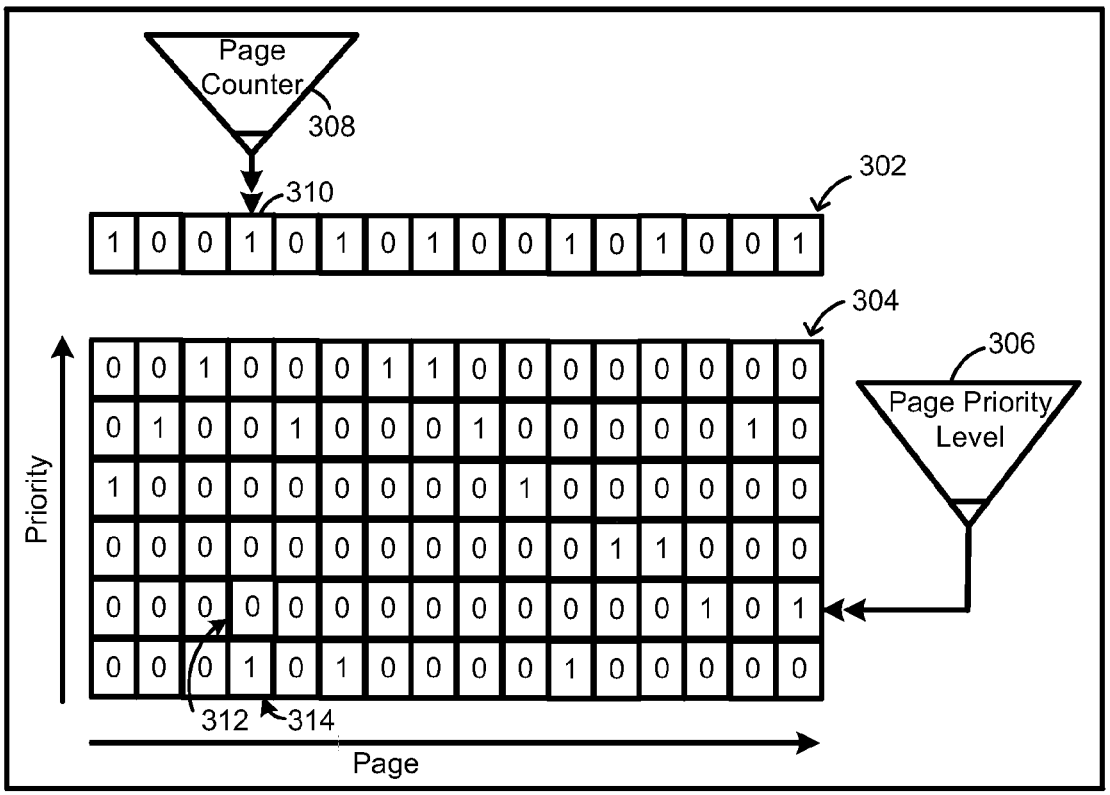

More specifically, as shown in FIGS. 3A and 3B and explained in detail in association therewith, such a dirty bit may be assigned to each memory page within a bit map data structure in which levels of the data structure are associated with different priority levels for transfer of memory pages. As shown in FIG. 1, such a bit map data structure may be stored within dirty bit data 140 of the memory transfer manager 132. Other techniques may be used to assign priority to the memory pages 120, as described below and as would be apparent to one of skill in the art. Thus, the page scanner 136 may be configured to scan memory pages of the memory pages 120 for potential transfer within the live migration 110. As in the examples as just described, the page scanner 136 may selectively scan the memory pages 120 during a particular transfer/scanning iteration thereof, based on a priority assigned to each memory page or set of memory pages.

Further, as referenced above, regardless of how prioritization is assigned to the scanning process (or if any prioritization is used at all), the memory transfer manager 132 may be configured to attempt to determine whether or not it is necessary to transfer an entirety of a particular candidate memory page currently being scanned and considered for inclusion within the live migration 110. More specifically, the memory transfer manager 132 may seek to determine whether existing memory pages 124 of the destination hardware resources 118 may be leveraged or otherwise used to reduce or eliminate the need to transfer all of the contents of a candidate memory page currently under consideration for transfer.

For example, in the example of FIG. 1, the memory transfer manager 132 may be configured to compare a "fingerprint" 121f of the candidate memory page 121 with existing page fingerprints (e.g., existing page fingerprints 170) of the existing memory pages 124. In this regard, it may be appreciated that the term "fingerprint" or "page fingerprint" refers generally to an abbreviated description or identification of, or reference to, a memory page. That is, known techniques exist for representing or otherwise identifying a memory page by capturing certain characteristics or aspects thereof within such a fingerprint. Such page fingerprinting techniques, by themselves, are generally well-known, and therefore are not described here in more detail. Moreover, other techniques besides page fingerprinting may be used to identify or otherwise reference the memory pages 120 and/or the existing memory pages 124, as would be apparent to one that is skilled in the art.

In example operations, then, the page scanner 136 may scan the memory pages 120, possibly based on assigned priorities thereof, and may identify the candidate memory page 121 for potential transfer within the live migration 110. A fingerprint generator 142 of the memory transfer manager 132 may be configured to generate the candidate page fingerprint 121f of the candidate memory page 121 in question.

In example implementations, as described in more detail below, a priority checker 144 of the fingerprint generator 142 may be configured to determine whether it is necessary at a current time, based on a priority of the current memory page 121 in question, to generate a fingerprint for the candidate memory page 121. As also described in more detail below, one technique for representing the candidate memory page fingerprint 121f may rely on the use of a bloom filter 146, which, generally speaking, provides an ability to represent the page fingerprint 121f in a compressed form that is easily used for comparison to fingerprints (e.g., 170) of the existing memory pages 124.

More generally, a fingerprint comparator 148 of the memory transfer manager 132 may be configured to receive the fingerprint 121f of the candidate memory page 121 as provided by the fingerprint generator 142 for comparison therewith against fingerprints (e.g., 170) of the existing memory pages 124. As already referenced above, and as described in more detail below, numerous techniques exist for providing the fingerprint comparator 148 with the fingerprints of the existing memory pages 124, and for executing the comparison therebetween. In general, however, it will be appreciated that the fingerprint comparator 148 is configured to compare the generated fingerprint 121f of the candidate memory pages 121 against some or all of the existing memory pages 124 (or fingerprints thereof) of virtual machine 112.

Consequently, the fingerprint comparator 148 may decide whether there is a match between the fingerprint 121f of the candidate memory page 121 and at least one fingerprint of the existing page fingerprints (e.g., 170) of the existing memory pages 124. If there is such a match (e.g., due to the presence of the duplicate candidate page 126), then a page transfer manager 150 may be configured to receive information about the match and to transfer only the fingerprint 121f of the candidate memory page 121. Then, the duplicate candidate page 126 may be duplicated, linked, referenced, or otherwise used in place of the candidate memory page 121 within the application 114. In this way, the page transfer manager 150 is not required to send an entirety of the contents of the candidate memory page 121 as part of the live migration.

In contrast, it may occur that the fingerprint comparator 148 does not detect a match between a generated fingerprint of the fingerprint generator 142 and fingerprints of the existing memory pages 124. For example, when the page scanner 136 reaches the second candidate memory page 122, the fingerprint generator 142 may generate a fingerprint therefore (not explicitly shown in FIG. 1) which the fingerprint comparator 148 may then compare to the existing memory pages 124 (i.e., may compare to fingerprints 170 of the existing memory pages) and may determine that the second candidate memory page 122 does not match any of the existing page fingerprints 170 and therefore does not include a duplicate thereof within the existing memory pages 124. Therefore, unlike the candidate memory page 121, the page transfer manager 150 may send an entirety of contents 122c of the second candidate memory page 122 as part of the live migration 110. Additional examples of the fingerprint generator 142, the fingerprint comparator 148, and the page transfer manager 150 are provided in more detail, below.

The memory transfer manager 132 also may include an acknowledgement manager 152, which may generally be configured to track and otherwise confirm a success or failure of various aspects (e.g., messages or other transfers) of the live migration 110, using one or more acknowledgement lists 154. For example, each time that the page transfer manager 150 transmits a memory page or reference thereto or portion thereof, the acknowledgement manager 152 may track such a transmission using a wait acknowledgement list, and may thereafter wait to receive a corresponding message from the memory manager 132 of the destination hypervisor 116 to confirm receipt.

In general, there may be at least 3 different types of acknowledgements (or lack thereof), that the acknowledgement manager 152 may receive (or fail to receive) in response to the various transmissions of the page transfer manager 150. For example, the page transfer manager 150 may transfer contents of a memory page, or reference thereto or portion thereof, and the acknowledgement manager 152 may correspondingly increment the wait list of the acknowledgement list 154. At a later time, the acknowledgement manager 152 may receive a positive acknowledgement, designating that an acknowledgement response was received from the memory transfer manager 134 of the destination hypervisor 116, and that a desired result was achieved. For example, if the page transfer manager 150 transmits contents of a memory page, or reference thereto, or portion thereof, to the memory transfer manager 134, then a positive acknowledgement from the memory transfer manager 134 may be sent and received by the acknowledgement manager 152 so that the corresponding entry to the wait list of the acknowledgement list 154 may be designated as having been successfully completed. In other words, an affirmative or positive outcome is reached, and that aspect of the live migration 110 may be considered to have completed successfully. In contrast, if a transfer of the page transfer manager 150 is not successful in achieving a desired outcome, then a negative acknowledgement may be sent by the memory transfer manager 134 and received at the acknowledgement manager 152 as a negative acknowledgement.

For example, it may occur that the page transfer manager 150 may transmit the fingerprint 121f of the candidate memory page 121, based on information indicating a presence of the duplicate candidate page 126 within the existing memory pages 124. In such a case, if the duplicate memory page 126 actually exists, then the duplicate memory page 126 may be used and leveraged as described herein to avoid sending of the full contents of the candidate memory page 121 in question. In such a case, a positive acknowledgement will be received by the acknowledgement manager 152, so that a corresponding entry of the wait list of the acknowledgement lists 154 may be marked as successfully completed.

In contrast, it may occur that the page transfer manager 150 transmits the fingerprint 121f, based on information that the duplicate memory page 126 exists within the existing memory pages 124, whereupon it may occur that, in fact, such a duplicate memory page is not available within the existing memory pages 124. In this case, the acknowledgement manner 152 will receive a negative acknowledgement (i.e., specifying that a desired or expected outcome was not achieved), whereupon such a negative acknowledgement may be matched with its corresponding entry of the wait list of the acknowledgement list 154, so that appropriate action may later be taken (e.g., an entire content of the candidate memory page in question may later be transferred).

As may be appreciated from the above discussion, various elements or components of the memory transfer manager 134 of the destination hypervisor 116 may be configured to interact with the memory transfer manager 132 of the source hypervisor 106, so as, for example, to provide necessary information to the memory transfer manager 132. For example, the memory transfer manager 134 may include a page handler 156 which is configured to receive transmissions of the page transfer manager 150. For example, as may be appreciated, the page transfer manager 156 may receive, e.g., either the entirety of contents of a transferred memory page, or may receive a fingerprint of a memory page which is thought to correspond to a duplicate memory page in the existing memory pages 124.

In case such a fingerprint is received by the page handler 156, a fingerprint comparator 158 may be configured to compare the received page fingerprint to fingerprints of the existing memory pages 124, to determine whether the received fingerprint is, in fact, corresponding to the fingerprint of a duplicate memory page thereof. As referenced above, the fingerprint comparator 158 may be configured to provide a check or verification of an expected outcome, e.g., may be used to verify that a received fingerprint of the memory page of the memory page 120 is, in fact, associated with a duplicate memory page thereof within the existing memory pages 124. In other examples, as described in more detail below, the fingerprint comparator 158 may additionally or alternatively be used as a primary point of comparison between transferred page fingerprints and fingerprints of the existing memory pages 124.

In the event that the page handler 156 receives a page fingerprint from the page transfer manager 150, and the fingerprint comparator 158 subsequently verifies that the received page fingerprint is associated with a corresponding duplicate memory page of the existing memory pages 124, then a duplicate page handler 160 may be configured to leverage or otherwise use the duplicate memory page (e.g., the duplicate candidate page 126). For example, the duplicate page handler 160 may copy the duplicate candidate page 126 to a desired memory location for appropriate use within the application 114 of the virtual machine 112. In other examples, the duplicate page handler 160 may implement a link or other reference to the identified duplicate memory page 126, so that the application 114 may have access thereto during its normal operation.

In yet another example, as referenced above, it may occur that the destination hardware resources 118 and the destination hypervisor 116 currently provide support and/or a platform for more than one virtual machine. For example, as shown, a second virtual machine 112' having an application 114' may include existing memory pages 124'. In this case, the existing memory pages 124' may include various memory pages which may also serve as a potential pool or repository for duplicate candidate pages that may be leveraged or otherwise used by the duplicate page handler 160.

For example, content based page sharing (CBPS) is a known technique in which memory pages of different virtual machines running on the same underlying hardware resources are able to share or otherwise mutually access duplicate memory pages, so as, for example, to optimize use of the underlying hardware resources 118. For example, in an isolated operation of the destination hardware resources 118, it may occur that the virtual machine 112 and the virtual machine 112' are both supported by the destination hardware resources 118 and the destination hypervisor 116. In this case, it may occur that a memory page of the application 114, or some other application, may be identical to a corresponding memory page of the application 114' of the virtual machine 112'. In this case, content based page sharing may be used to provide the application 114 with the benefit or use of the corresponding memory page of the application 114'.

In a similar way, the duplicate page handler 160 may implement content based page sharing, or other similar techniques, in order to optimize the live migration 110 as described herein. That is, the duplicate page handler 160 may implement CBPS to leverage an existing duplicate page anywhere within the destination hardware resources 118 for use with a currently-transferred virtual machine, such as the virtual machine 112.

If operations of the page handler 156, fingerprint comparator 158, and/or the duplicate page handler 160 are successful, then an acknowledgement manager 162 of the memory transfer manager 134 may act to provide a corresponding positive acknowledgement to the acknowledgement manager 152, so that, as referenced above, the acknowledgement manager 152 may thereafter match the positive acknowledgement to a corresponding entry of the wait list of the acknowledgement lists 154. Conversely, if a difficulty or unsuccessful outcome occurs, then the acknowledgement manager 162 may send a corresponding negative acknowledgement to the acknowledgement manager 152 for corresponding matching of the appropriate entry of the wait list, so that appropriate response to the negative outcome may thereafter be taken.

Of course, in the event that some difficulty occurs (e.g., transmission of the page transfer manager 150 is interrupted or otherwise never received at the page handler 156), then the acknowledgement manager 162 may be unable to send any acknowledgement to the acknowledgement manager 152. In this case, a corresponding entry of the wait list may not be marked as either positive or negatively acknowledged as part of a live migration 110. Then, as described in more detail below, appropriate action may be taken with respect to such non-acknowledged transfers of the page transfer manager 150 (e.g., re-sending of the non-acknowledged page(s)).

As referenced above, there are a number of techniques by which it is possible to compare a fingerprint of a candidate memory page against fingerprints of the existing memory pages 124 (or the existing memory pages 124'). In this regard, the memory transfer manager 134 is illustrated as including a fingerprint generator 164 which may be configured to generate existing page fingerprints for some or all of the existing memory pages 124/124'. Such existing page fingerprints may be stored in an existing page fingerprint database 166, or, as described in more detail below, may be generated on demand, as needed. As referenced above, one technique for generating or otherwise representing page fingerprints (here, fingerprints of the existing memory pages 124/124'), a bloom filter 168 may be used to provide a compressed and easily matched version of the existing page fingerprints.

Thus, at least one or more of the following techniques may be used to generate, compare, or otherwise use fingerprints of the memory pages 120 and/or the existing memory pages 124/124'. Of course, such techniques are merely examples, and other techniques also may be used in other embodiments, as would be apparent to one that is skilled in the art.

For example, it may occur that the fingerprint generator 164 simply generates existing page fingerprints 170 at a particular point in time for storage in the existing page fingerprints 166 and/or for transmission to the fingerprint comparator 148. In such an example embodiment, the fingerprint comparator 148 may receive the existing page fingerprints 170 for comparison against a candidate page fingerprint (e.g., 121*f*) from the fingerprint generator 142, as referenced above.

In some embodiments, generation of the existing page fingerprints 170 in this manner may unnecessarily consume transmission resources of the system 100. Consequently, in example embodiments, it may occur that an existing page fingerprint cache 172 may be provided and utilized. For example, it may occur that the fingerprint generator 164 may periodically (or upon request) generate the existing page fingerprint cache 172 representing fingerprints of the current state or status of existing memory pages 124/124'. Then, the existing page fingerprint cache 172 may be stored at the memory transfer manager 134 and/or at the memory transfer manager 132, so as to thereby be immediately available to the fingerprint comparator 148. Then, each time that a page fingerprint of a candidate memory page is received from the fingerprint generator 142, the fingerprint comparator 148 may immediately compare the received candidate page fingerprint (e.g., 121*f*) against the existing page fingerprint cache 172.

It may be appreciated, however, that in such example embodiments it may occur that the fingerprints of the existing page fingerprint cache 172 may become partially or completely outdated, depending, for example, on a frequency with which the existing page fingerprint cache 172 is generated and/or transmitted, relative to a frequency of change of the existing memory pages 124/124'. That is, for example, it may occur that the fingerprint generator 164 generates existing page fingerprint cache 172 at a first point in time and that the fingerprint comparator 148 thereafter compares page fingerprints from the fingerprint generator 142 against the received existing page fingerprint cache 172. Over time, however, the existing memory pages 124/124' may be altered (e.g., may be changed by users of the application 114 and/or the application 114'). In this case, the existing page fingerprint cache 172 may become outdated. Consequently, the fingerprint comparator 148 may determine a positive match, when in fact, no actual duplicate memory page of the candidate memory page in question actually exists within the existing memory pages 124/124'.

Conversely, it may occur that the fingerprint comparator 148 reaches a conclusion that no match exists for a currently-compared candidate page fingerprint within the existing page fingerprint cache 172, when, in fact, perhaps a duplicate memory page has been recently stored within the existing memory pages 124/124' (i.e., since the cache 172 was most-recently created or updated). As referenced above, and as described in more detail below, the acknowledgement managers 152, 162 may thus be useful in tracking whether such discrepancies occur, and thereby ensuring that results of the live migration 110 are ultimately successful and complete.

As a final example of a technique by which the fingerprint generator 164 may provide page fingerprints for comparison to candidate memory page fingerprints, as referenced above, the bloom filter 168 of the fingerprint generator 164 may generate existing page fingerprints bloom filter 174 for transmission to/storage at the fingerprint comparator 148. In this way, the fingerprint comparator 148, as referenced above, may compare the bloom filter 146 (e.g., for the candidate page 121 or fingerprint 121*f* thereof) with the existing page fingerprint bloom filter 174 to determine a potential match therebetween.

Figure 2:
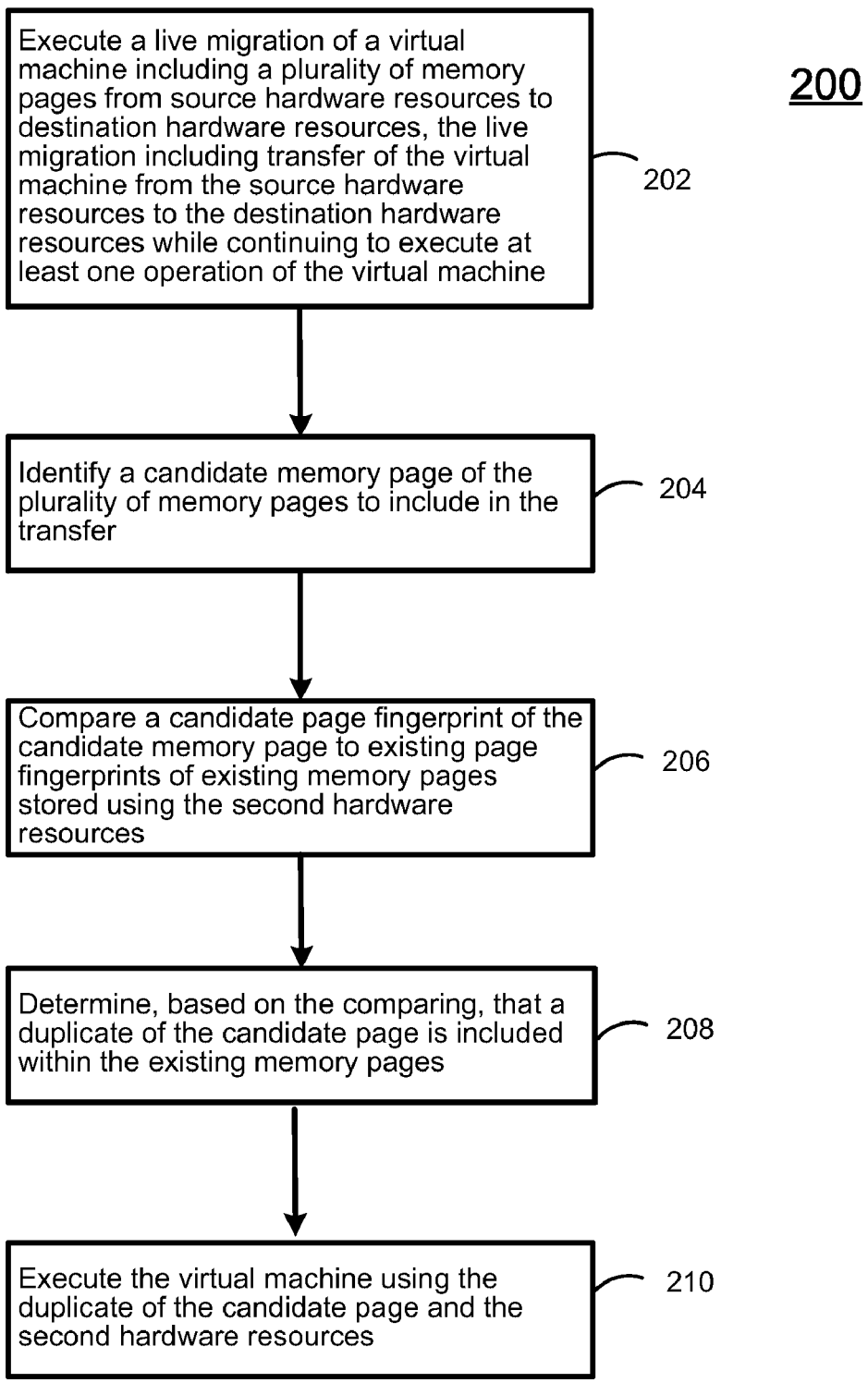
FIG. 2 is a flowchart illustrating example operations of the system of FIG. 1.

FIG. 2 is a flowchart 200 illustrating example operations of the system 100 of FIG. 1. In the example of FIG. 2, operations 202-210 are illustrated in sequential order; however, it may be appreciated that such illustration is merely for the sake of example, and other implementations would be apparent to one of skill in the art. For example, operations may be performed in a different order than that illustrated (unless otherwise specified herein), or, in other examples, operations may be performed in a partially overlapping or parallel fashion. Moreover, additional or alternative operations may be included as compared to the example operations 202-210 of FIG. 2.

In the example of FIG. 2, a live migration of a virtual machine including a plurality of memory pages from source hardware resources destination hardware resources may be executed, the live migration including transfer of the virtual machine from the source hardware resources to the destination hardware resources while continuing to execute at least one operation of the virtual machine (202). For example, as described above in detail with respect to FIG. 1, the virtual machine 102 may be transferred as part of the live migration 110 from the source hardware resources 108 for execution on destination hardware resources 118 as the virtual machine 112. As also shown and described above, the virtual machine 102/112 may include the plurality of memory pages 120. Further, operations of the virtual machine 102, e.g., operations associated with the application 104 and with the memory pages 120, may continue (at least in part) during the live migration 110 (e.g., as operation of either or both of the applications 104/114).

A candidate memory page of the plurality of memory pages to include in the transfer may be identified (204). For example, the page scanner 136 may execute a scanning operation of some or all of the memory pages 120, and, within that scanning operation, may identify the candidate memory page 121. As also described above, the priority manager 138 may track priority levels of some or all of the memory pages 120, and may thereby instruct the page scanner 136 to execute page scanning operations including prioritizing the memory pages 120. As described, such prioritization may be based on a frequency or extent to which the memory pages 120 are dirtied or otherwise altered during the continuing operations of the virtual machine 102 (e.g., operations of the application 104/114).

A candidate page fingerprint of the candidate memory page may be compared to existing page fingerprints of existing memory pages stored using the second hardware resources (206). For example, the fingerprint generator 142 may generate the candidate page fingerprint 121*f*, perhaps based on a prioritization level associated therewith, as determined by the priority manager 138/priority checker 144. Meanwhile, as referenced above, existing page fingerprints may be obtained for comparison to the candidate page fingerprint 121*f* using one or more of a variety of available techniques. For example, as described, a fingerprint generator 164 associated with the destination hardware resources 118 may be configured to generate page fingerprints of existing memory pages 124/124' currently available within one or more virtual machines 112/112' being supported by the destination hardware resources 118, as shown in FIG. 1. Following generation of page fingerprints of the existing memory pages 124/124', the resulting existing memory page fingerprints may be stored locally to the destination hardware resources 118, e.g., within the existing page fingerprints 166, or and/or may be transferred to the source hardware resources of 108 as existing page fingerprints 170 (i.e., one existing page fingerprint at a time, as needed, or in groups), or within an existing page fingerprints cache 172 which includes a plurality of the existing page fingerprints, or expressed within bloom filter 174 as a compressed form or version of the existing memory page fingerprints. As also described herein, the existing memory page fingerprints may be generated/stored at one or both of the destination hardware resources 118 or the source hardware resources 108, or with or at another location not explicitly shown in the example of FIG. 1, or may be expressed in a compressed format other than that of the bloom filter.

Regardless of how the candidate page fingerprint 121*f* and/or the existing page fingerprints 166/170/172/174 are obtained, the fingerprint comparator 148 at the source hardware resources 108 may be used to determine whether the candidate page fingerprint 121*f* is contained within the existing memory page fingerprints 170/172/174. That is, the fingerprint comparator 148 may be configured to determine that the candidate page fingerprint 121*f* is associated with a memory page of the existing memory pages 124/124' that is an effective duplicate of all or part of the underlying candidate memory page 121, such as, for example, the duplicate candidate page 126/126'.

Based on the comparing, it may be determined that a duplicate of the candidate page is included within the existing memory pages (208). For example, as just described, the fingerprint comparator 148 may determine that the duplicate candidate page 126 of the candidate memory page 121 exists within the existing memory pages 124. That is, the duplicate candidate page is already available at the destination hardware resources 118. Consequently, as described, it is not necessary to transfer an entirety of contents of the candidate memory page 121 as part of the live migration 110. Rather, as described herein and illustrated in FIG. 1, only the candidate page fingerprint 121*f* need be sent, and the duplicate candidate page 126 (or the duplicate candidate page 126') may be leveraged and used at the destination hardware resources 118, e.g., may be copied, referenced, linked, shared, or otherwise used or taken advantage of within the context of the virtual machine 112.

Thus, the virtual machine may be executed using the duplicate of the candidate page and the second hardware resources (210). For example, the virtual machine 112 may be executed using the duplicate candidate page 126 at the destination hardware resources 118.

With respect to the operations of FIG. 2, it may be appreciated that FIG. 1 is illustrated as including a source hypervisor 106 and a destination hypervisor 116. However, it may occur that single hypervisor and/or other virtualization management or administration tool may be used to monitor or otherwise execute the live migration 110. In specific examples, components illustrated at the source hypervisor 106 may be included or executed in whole or in part at the destination hypervisor 116, or, conversely, components of the destination hypervisor 116 may be executed in whole or in part at the source hypervisor 106. Consequently, the live migration 110 may be understood to be executed primarily or exclusively at either of the source hypervisor 106 or the destination hypervisor 116, so that the various operations described above similarly may be executed in whole or in part at either location.

For example, as referenced above with respect to the operation 206, the fingerprint comparator 148 of the source hypervisor 106 may be used to compare the candidate page fingerprint 121*f* to the existing page fingerprints 170/172/174. However, as also referenced above, such fingerprint comparisons may be executed, additionally or alternatively, using the fingerprint comparator 158 of the memory transfer manager 134 of the destination hypervisor 116. For example, as referenced herein, it may occur that the candidate page fingerprint 121*f* is transferred by the page transfer manager 150 and compared by the fingerprint comparator 158 to the existing page fingerprints 166. The fingerprint comparator 158 may be used upon receipt of the candidate page fingerprint 121*f*, so as to verify that the candidate memory page 121 is in fact effectively replicated by the duplicate candidate memory page 126, and/or to facilitate operations of the duplicate page handler 160 in accessing or otherwise using the duplicate candidate page 126 (or 126').

FIGS. 3A and 3B are block diagrams of data structures used in example implementations of the priority manager 138, dirty bit data 140, page scanner 136, and priority checker 144. In the example of FIG. 3A, row 302 of data includes a plurality of dirty bits in which each bit corresponds to a page of the memory pages 120. Thus, for example, one bit of the dirty bits 302 may correspond to the candidate memory page 121, while another bit of the dirty bits 302 may correspond to the second candidate memory page 122.

Meanwhile, priority data structure 304 includes a data structure in which again individual pages are represented or referenced, here within each column of the data structure 304. As shown, each column of the data structure 304 corresponds to a same memory page as a corresponding dirty bit of the row 302 that is positioned over such column.

As shown, a vertical direction along the data structure 304 indicates a priority of each memory page. For example, as referenced above, memory pages which are frequently dirtied may be assigned a low priority, so that such pages are relatively infrequently transferred as part of the live migration. Conversely, pages which are not dirtied on a frequent basis may be assigned a high priority, and therefore may be more likely to be included within the live migration 110 at a given point in time.

In an example operation, the page scanner 136 may obtain a page priority level 306 from the priority manager 138. Then, the page scanner 136 may scan the dirty bit data 140 as shown in FIG. 3A by scanning a row of the data structure 304 corresponding to a priority level identified by the page priority level 306, as shown. At that priority level, the page scanner 136 may progress through the memory pages 120 by following the dirty bit data 302, as illustrated by a page counter 308. In the example of FIG. 3A, a page priority level is selected as shown by the page priority level 306, and a page is correspondingly identified at a given point within the scanning process, as shown by the page counter 308. More specifically, a priority of such a page, as shown, is associated with the dirty bit 310, at the page priority level 306, as illustrated by bit 312.

Operations using the examples of FIGS. 3A and 3B are illustrated and discussed below in detail, e.g., with respect to the flowcharts of FIGS. 4-7. In general, however, it may be appreciated that such operations may proceed by scanning of the memory page scanner 136 through a selected priority level (row) of the data structure 304, so that, within that priority level (row), each memory page at that priority level may be checked to see whether the corresponding dirty bit is set.

In other words, the page scanner 136 will scan through each priority level (row) to select entries containing the bits set to the value 1, and will skip entries with the values set to 0. Upon selecting the bit value set to 1, the page scanner 136 will determine whether a corresponding dirty bit is also set to 1 or 0.

If the dirty bit is set to 1, the page scanner 136 determines that the corresponding memory page of the memory page 120 has been altered since a most recent scanning iteration or operation of the page scanner 136. In this case, as shown in examples of FIG. 3B, a priority level of the memory page in question may be decremented, as shown by the lowering of the data bit value 1 to a bit entry 314 within FIG. 3B, in corresponding setting of the data value 312 from 1 to 0.

Over time, it may be appreciated that pages which are frequently dirtied or altered will experience a gradual and progressive decrementing of their associated priority levels from higher to a lower priority level. Conversely, if a page at a given priority level is checked by the page counter and determined to have a dirty bit set to 0, then the page scanner 136 may determine that the relevant memory page has not been altered since the most recent sending thereof within the live migration 110, and therefore may determine that there is no need to resend the page at this time. Then, a corresponding page priority may be incremented to the higher priority level.

Figure 4:
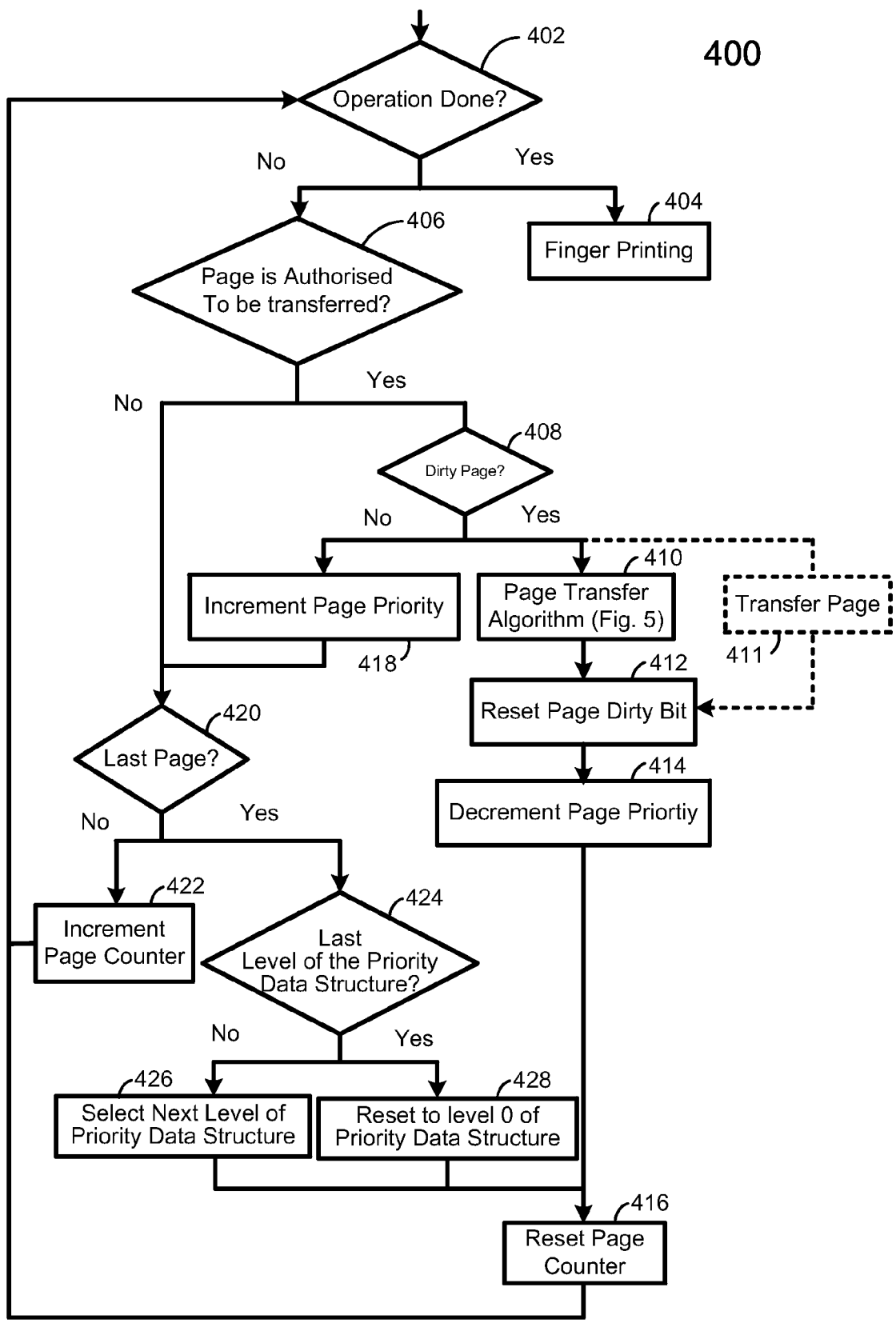
FIG. 4 is a flowchart illustrating operations of the system 100 of FIG. 1, in which the live migration includes the page priority scheme of FIGS. 3A-3B.

FIG. 4 is a flowchart 400 illustrating operations of the system 100 and using the data structures of FIGS. 3A and 3B. In the example of FIG. 4, it is first determined whether a given operation of using the data structures 304 and dirty bit map 302 are completed (402). If so, then necessary or periodic fingerprinting (404) may occur. For example, the existing memory page fingerprints 166/172/174 may be generated.

Figure 5:
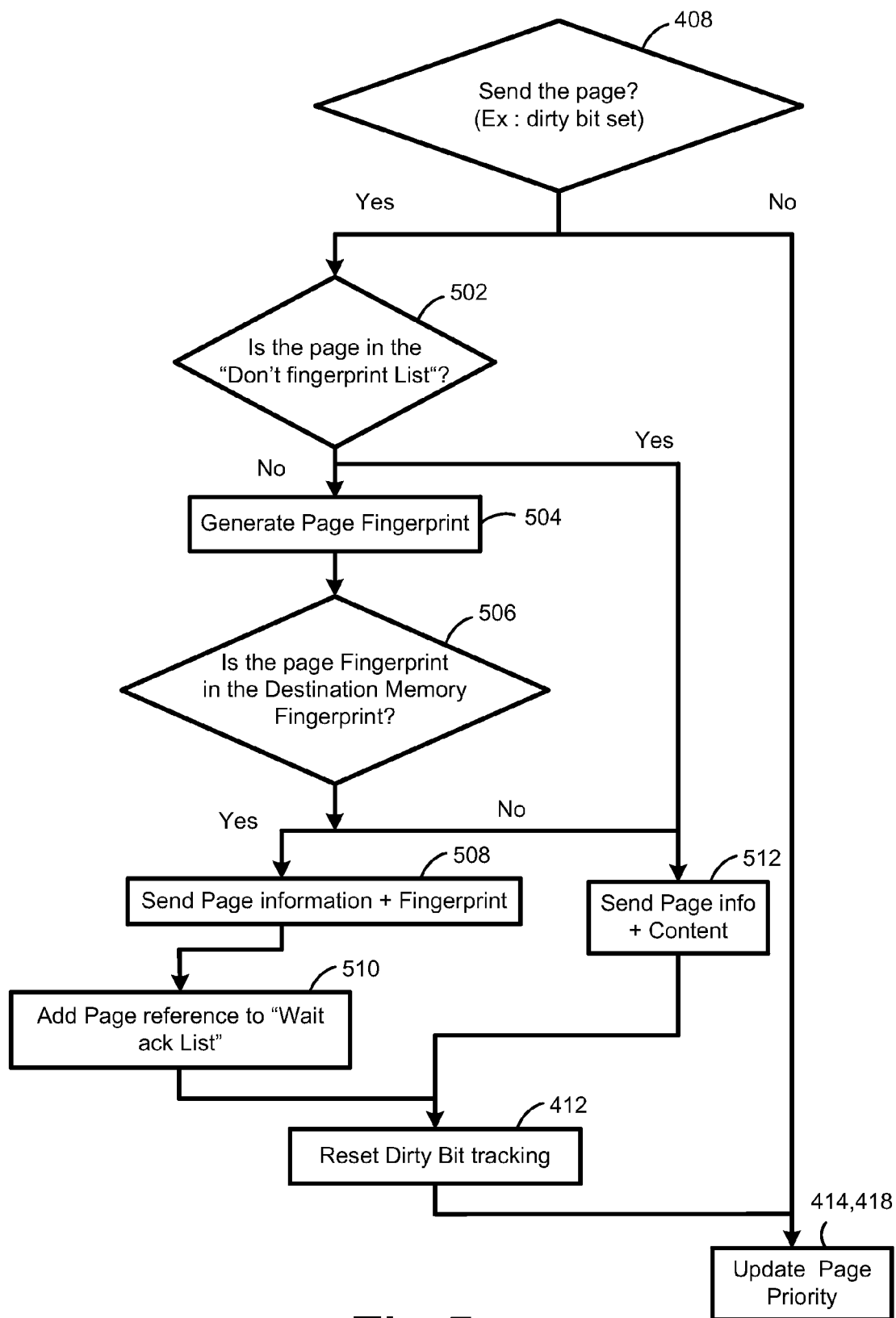
FIG. 5 is a flowchart illustrating a memory page transfer algorithm of the system of FIG. 1.

However, if operations are ongoing, then a determination may be made as to whether the page in question is authorized to be transferred (406) (criteria for (non)authorization are discussed below). If the page being considered is authorized to be transferred, then the corresponding dirty bit for the page may be examined in order to determine whether the page in question constitutes a dirty page (408), i.e., whether the dirty bit is set to a value of 1. As described above, if the dirty bit is set to 1, then the corresponding memory page may undergo a page transfer algorithm (410), or variations thereof, as described above with respect to FIG. 1 and illustrated in more detail in the example of FIG. 5. In general, such a page transfer algorithm, as described, seeks to determine and leverage an existence of the duplicate candidate page 126/126' for the candidate memory page 121 in question. In additional or alternative implementations, however, it may occur that the page transfer algorithm of FIG. 5 is not executed, in whole or in part. In such cases, the candidate memory page 121 in question may be directly transferred in its entirety as part of the live migration 110 (411). For example, in a first iteration of the flowchart 400, the candidate memory page 121 may be considered, and either may be fingerprinted as part of the page transfer algorithm (410), or may be transferred directly (411).

In either case, the dirty bit of the candidate memory page (e.g., 121) may be reset from 1 to 0, thereby indicating that the candidate memory page 121 may be considered to be clean or unaltered since its just-completed most recent transfer within the live migration 110 (412). Further, a page priority level of the candidate memory page 121 may be decremented (414), i.e., the value 1 of the candidate memory 121 within the selector map data structure 304 may be lowered from the priority level to an immediately lower priority level, as shown with the example of the priority bits 312 and 314 of FIG. 3B.

Then, the page counter 308 may be reset (416), i.e., may be moved by the page scanner 136 to an immediately succeeding candidate memory page, e.g., the second candidate memory page 122. Operations of the flowchart 400 may then continue, e.g., if the second candidate memory page 122 is authorized to be transferred, but is not a dirty page (406, 408), then a corresponding page priority level of the second candidate memory page 122 may be incremented (418), for example, a bit value set to 1 for the second candidate memory page 122 may be raised vertically within the priority levels of the corresponding column of the priority data structure 304 of FIGS. 3A and 3B.

Once this incrementing occurs, or, as shown, if the memory page is not authorized to be transferred (examples of situations in which a given page is not authorized to be transferred are provided in more detail below, but generally speaking, it may occur that a previously-transferred memory page has not been acknowledged as having been received, or may have received a negative acknowledgment. In such cases, such memory pages may receive treatment which is outside the normal operational flow of FIG. 4, as described below), then the operations proceed to a determination of whether the memory page in question is the last page to be transferred (420).

Then, if the second candidate memory page 122 is not the last page to be considered of the memory pages 120 (420), then the page counter 308 may be incremented (422) by the page scanner 136, and the operations of the flowchart 400 may continue (402). If, however, the second candidate memory page 122 is the last page (420), then it may be determined the current priority level of the priority data structure 304 is the last level thereof (424), if not, then the next level of the priority data structure 304 may be selected (426).

Conversely, if the current priority level is the last level of the selector map data structure 304, then the priority level may be reset back to an original priority level 0 of the priority data structure 304 (428). In either case, the page counter 308 may continue to a next or third memory page (not explicitly shown in the example of FIG. 1).

Operations may thus continue until all the memory pages 120 have been considered. As described above, at this time, an operation maybe considered temporarily or permanently completed. Otherwise operations will continue with a next-selected memory page of the memory pages 120 and a subsequent page scanning operation within the live migration 110.

FIG. 5 is a flowchart 500 illustrating example operations of the system 100 in FIG. 1 in which a page transfer algorithm is executed. In the example of FIG. 5, as referenced above, such a page transfer algorithm may be executed within the operation 410 of the flowchart 400 of FIG. 4.

Thus, FIG. 5 illustrates the determination of FIG. 4 as to whether, for a given page at a given priority level, a corresponding dirty bit is set to a value of 1 and thereby indicates that the candidate memory page in question needs to be transferred with the live migration 110 (408). If not, as already described with respect to FIG. 4, operations may continue with an appropriate incrementing of a priority level of the candidate memory page in question (e.g., as an example of updating the page priority level in FIG. 5, which generally may include either incrementing or decrementing the page priority level as illustrated in operations 414, 418 of FIG. 4). Otherwise, the page transfer algorithm may proceed as described above with respect to FIG. 1 by attempting to leverage a potential presence of the duplicate candidate memory page 126/126 within the existing memory pages 124/124', so as to avoid sending an entirety of the contents of the candidate memory page 121/122 in question.

In the example of FIG. 5, operations begin by making a determination as to whether the candidate memory page 121 in question is contained within a "don't fingerprint list" of the acknowledgement list 154 managed by the acknowledgement manager 152 of FIG. 1. Construction of such a "don't fingerprint list" is described below in more detail with respect to FIG. 7. In general, however, it may be generally appreciated that, e.g., the fingerprint comparator 148 may initially determine that the candidate memory page 121 is included or duplicated within existing memory pages 124, using one or more of the various techniques for executing such a comparison, as described herein. As also referenced herein, such a determination may come in fact, be inaccurate. For example, use of bloom filters 146/174 may result in false positives associated with rare and irregular uncertainties or errors introduced by use of the bloom filters. In other cases, contents of the existing page fingerprint cache 172 may be outdated if the existing memory pages 124/124' have been updated since creation of the existing page fingerprint cache 172.

In these and other examples, the fingerprint comparator 148 may make an erroneous determination that the candidate memory page 121 (i.e., the duplicate 126 thereof) is included within the existing page fingerprints, so that the page transfer manager 150 consequently erroneously (in this example) sends the candidate page fingerprint 121, i.e., may send the candidate page fingerprint 121$f$ when, in fact, it is necessary to send an entirety of the contents to candidate memory page 121. In such a case, as referenced above, the page handler 156 will receive the candidate page fingerprint 176 and the fingerprint comparator 158 of the destination hypervisor 116 will determine that, in fact, no appropriate duplicate candidate page exists within the existing memory pages 124/124', and may therefore instruct the acknowledgement manager 152 to send the message acknowledging receipt of the candidate page fingerprint 176 but indicating that in fact no match thereof exists within the existing memory pages 124/124'. In such a case, the system 100 may add the candidate memory page 121 to the "don't fingerprint list," and therefore may not in the future send the page fingerprint of the candidate memory page 121, and may instead send only the entire contents of the candidate memory page 121, in order to ensure such contents are received as part of the live migration 110. If the candidate memory page is within the don't fingerprint list, e.g., is within a negative acknowledgement list of the acknowledgement list 154, then the system 100 may proceed with sending the entirety of the page information and contents of the candidate memory page 121 (512).

Otherwise, if the page is not in the "don't fingerprint list," than a page fingerprint 121$f$ of the candidate memory page 121 may be generated (504). For example, the fingerprint generator 142 may generate the candidate page fingerprint 121$f$ and/or may generate any representations thereof using the bloom filter 146, as referenced above.

If the thus-generated candidate page fingerprint 121$f$ is determined to be within the existing page memory fingerprints 170/172/174 associated with the destination hardware resources 118 (506), as determined by the fingerprint comparator 148 as described herein, (or by and/or by the fingerprint comparator 158), then it may be determined to be unnecessary to send an entirety of the page information page contents, and, rather, the page transfer manager 150 may send only certain page information regarding the candidate memory page 121 and the associated candidate pages fingerprint 121$f$ (508).

In this case, the acknowledgement manager 152, having sent the candidate page fingerprint 121$f$, may add a reference thereto within the acknowledgement list 154, i.e., may add to the wait list of the acknowledgement list 154. Then, as just described, at a later time either a positive or negative acknowledgement of the receipt of the candidate page fingerprints 121$f$ will be received. If a positive acknowledgement is received, then the reference to the candidate memory page fingerprint 121$f$ may be removed from the acknowledgment list 154, whereas, as already described, if no such positive acknowledgment is received, then the page may be listed within the "don't fingerprint list" and will later be sent only in its entirety including contents thereof.

At this point, a dirty bit of the memory page in question may be reset from 1 to 0, as described above for operation 412, and the page priority may be updated (i.e., here, decremented), as described with respect to operation 414.

Figure 6:
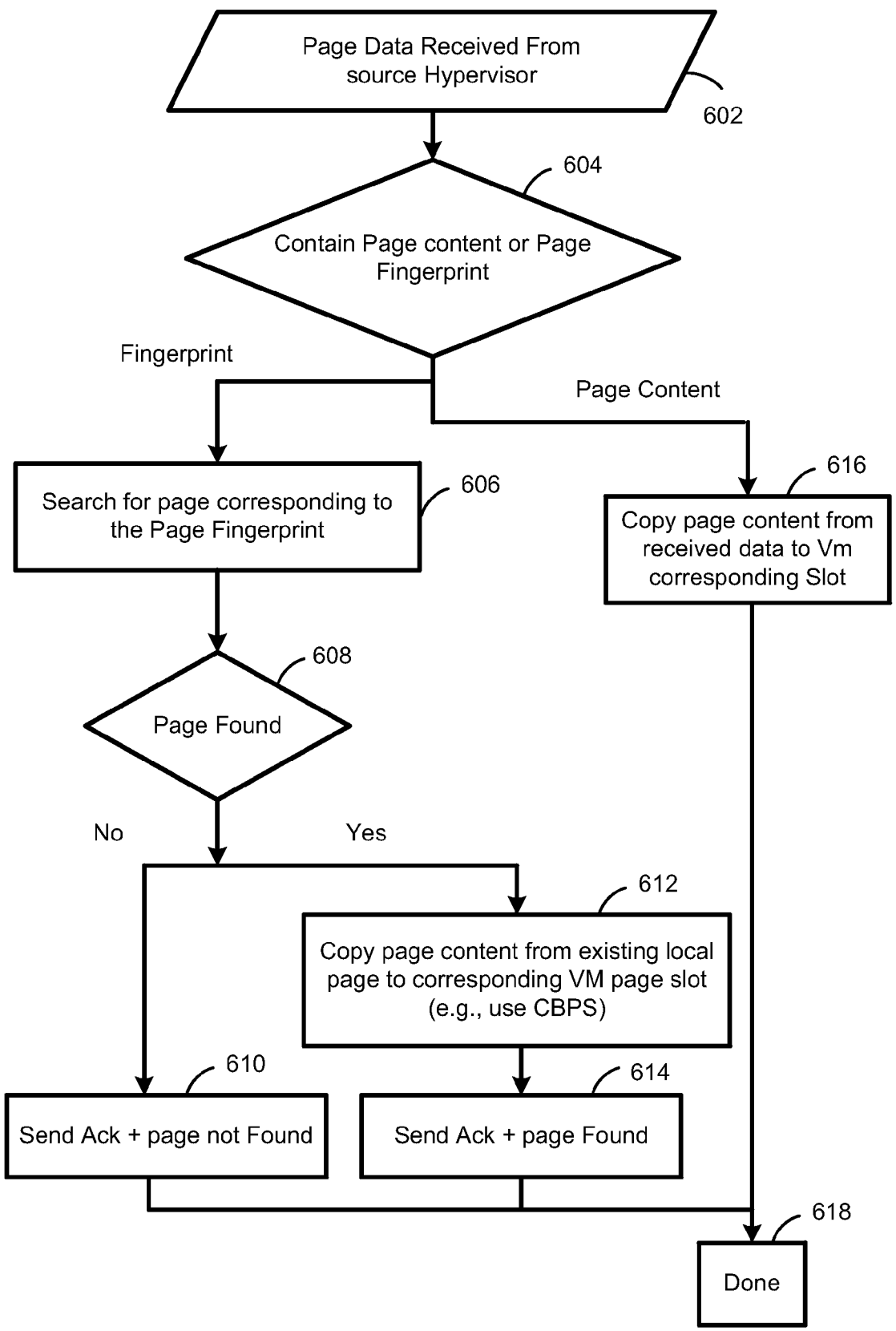
FIG. 6 is a flowchart illustrating receipt of a memory page during the live migration.

FIG. 6 is a flowchart 600 illustrating example operations at the destination hardware resources 118 during a live migration 110. For example, the flowchart 600 of FIG. 6 illustrates example operations in which memory pages, or page fingerprints thereof, are received as part of the live migration 110, such as, e.g., the candidate page fingerprint 121f and/or the second candidate page content 122c.

In the example of FIG. 6, such page data is received as part of the live migration 110, e.g., from the source hypervisor 106 (602). For example, the page handler 156 of the memory transfer manager 134 of the destination hardware resources 118 may receive either the candidate page fingerprint 121F or the second candidate page content 122c.

In the subsequent operation, a determination may be made as to whether the received page data contains actual page content or the page fingerprint identifying a page being transferred (604). For example, the page handler 156 may determine for the candidate page fingerprint 121f that, in fact, a page fingerprint has been received from the page transfer manager 150, and may determine with respect to the second candidate page content 122c that entire contents of the transfer page has been received.

In the former case in which the page fingerprint is received, a duplicate page corresponding to the page fingerprints may be searched for at the destination hardware resources 118 (606). For example, the fingerprint comparator 158 may receive the candidate page fingerprint 121f and may determine therefrom that the duplicate candidate page 126 and/or 126' corresponding to the candidate memory page 121 is/are existing at the destination hardware resources 118.

In such a case, it may determined that the corresponding duplicate page has been found (608), in which case the actual page content may be copied from existing memory pages to an appropriate memory page slot within the virtual machine 112. For example, the duplicate page handler 160 may utilize the duplicate candidate page 126 from within the existing memory pages 124 of the virtual machine 112. In other examples, as referenced above, the duplicate page handler 160 may implement a content based page sharing (CBPS) technique in which the duplicate candidate page 126' from an already-existing virtual machine 112' of the destination hardware resources 118 is used (e.g., is copied and/or referenced) for use within the application 114.

Subsequently, an acknowledgement including an identification and confirmation that the appropriate duplicate candidate page was identified and utilized may be forwarded to the source hardware resources 108, e.g., the source hypervisor 106 (614). For example, the acknowledgement manager 162 may send an acknowledgement to the acknowledgement manager 152 indicating positive confirmation of completion of the received candidate page fingerprint 121f and the use of the corresponding duplicate candidate page 126. Subsequently, the acknowledgement manager 152 may remove the corresponding wait acknowledgement that was stored in the acknowledgment list 154 when the candidate page fingerprint 121f was originally transferred by the page transfer manager 150. At this point, the page data receipt operations for the candidate page fingerprint 121f may be completed (618).

On the other hand, when the candidate page fingerprint 121f has been received (606), it may occur that the corresponding duplicate candidate page is not found within available existing memory pages 124/124' (608). In this case, a negative acknowledgement indicating failure to find the desired duplicate candidate page may be sent (610). For example, the acknowledgement manager 162 may send such a negative acknowledgement to the acknowledgement manager 162, whereupon the acknowledgement manager 162 may be unable to remove the candidate page fingerprint 121f from the wait list of the acknowledgement list 154, and/or may include identification of the candidate memory page 121 within a "don't fingerprint" list as referenced above with respect to FIG. 5 (502), and as described in more detail below with respect to FIG. 7. In general, as described therein, the operation of sending the negative acknowledgement identifying the received page fingerprint as not having been correlated with the corresponding duplicate page will ensure that the memory page in question is ultimately transferred in its entirety to the destination hardware resources 118, in order to ensure transfer thereof.

Further, in the event that the received page data includes page content (604), such as when the page handler 156 received the second candidate page content 122c, then the received page content is simply copied therefrom to an appropriate corresponding memory slot of the virtual machine 112, e.g., by the page handler 156 (616). In such a case, as shown, the received operations for the memory page in question may be completed (618).

Figure 7:
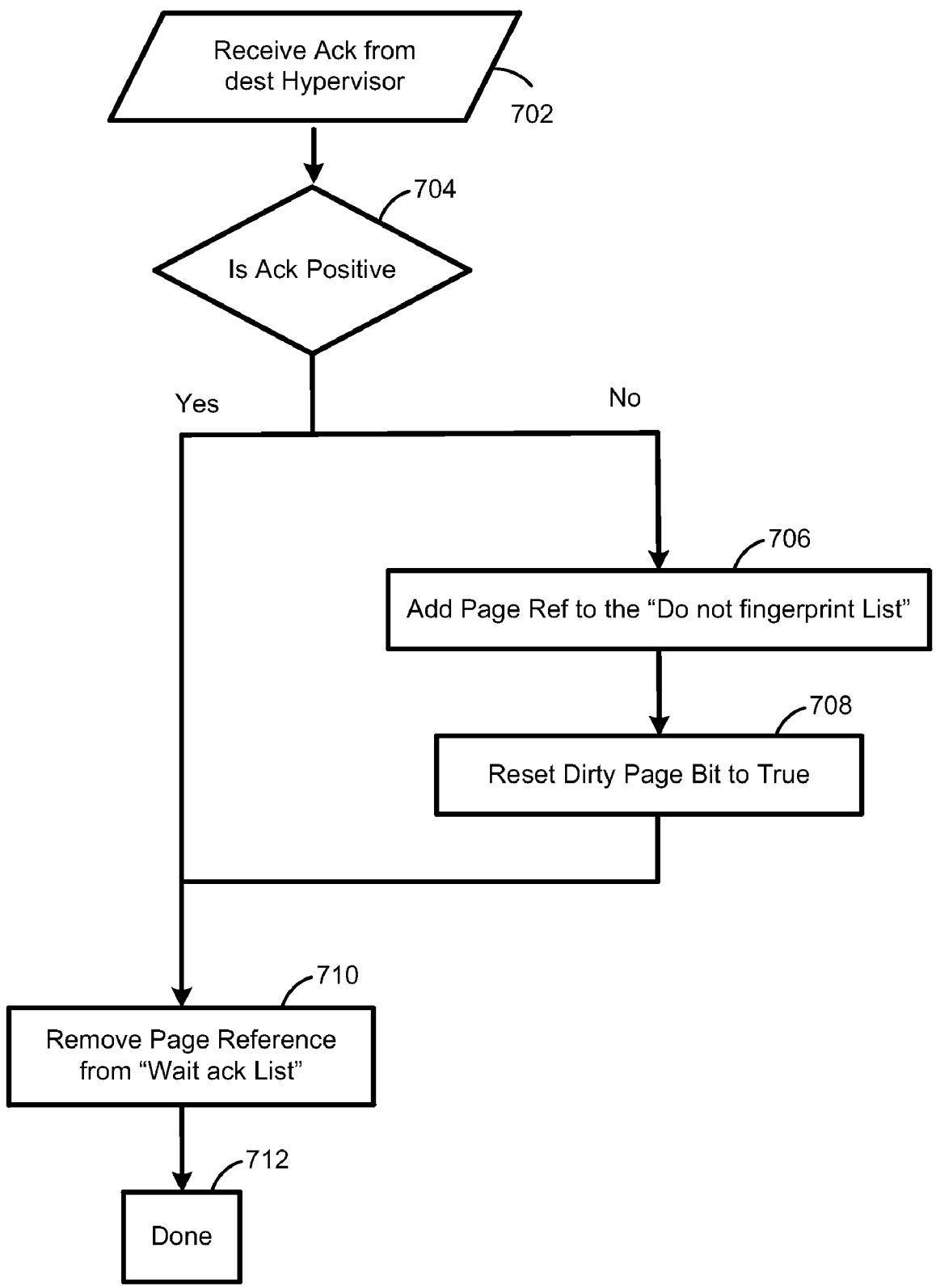
FIG. 7 is a flowchart illustrating an acknowledgement scheme used in the system of FIG. 1.

FIG. 7 is a flowchart 700 illustrating operations of the system 100 of FIG. 1 which are partially complementary to the operations of FIG. 6 as just described above, e.g., which illustrates the acknowledgment procedures executed by the acknowledgement manager 152 of the memory transfer manager 132.

That is, as referenced above, with respect to, e.g., FIG. 6, the acknowledgement manager 152 periodically receives acknowledgements from the destination hypervisor 116 (702). If the acknowledgement is not positive (704), e.g., is negative, then the acknowledgement manager 152 may add reference to the memory page in question to the "don't fingerprint list" (706). In other words, the acknowledgement 152 may infer from the negative acknowledgement that the page data previously sent by the page transfer manager 150 was not adequately or appropriately utilized at the destination hypervisor 116, e.g., such as when the memory transfer manager 134 is unable to match the candidate page fingerprint 121f to a desired duplicate candidate page at the destination hardware resources 118. In this case, as described, the memory transfer manager 132 may attempt to ensure that the candidate memory page 121 in question is ultimately received appropriately as part of the live migration 110 by subsequently sending an entirety of the page content thereof within the live migration 110. Further, the corresponding dirty bit of the memory page in question e.g., the candidate memory page 121, may be set to true or a value of 1, in order to indicate that the memory page in question will need to be re-sent (i.e., present) within the live migration 110.

Subsequently, reference to the memory page in question may be removed from the wait list of the acknowledgement list 154, since the acknowledgement manager 152 did in fact receive the (negative) acknowledgement indicating receipt of the candidate page fingerprint 121f at the page analyzer 156. Similarly, if the acknowledgement received is positive (704) then the reference to the memory page in question also may be removed from the wait list of the acknowledgement list 154, so that the acknowledgement operations of the flowchart 700 of FIG. 7 may be completed (712).

As referenced above, various conventional techniques exist for existing systems to implement the live migration of virtual machines. For example, as referenced above, a pre-copy technique may be used in which, generally speaking, the memory pages 120 are copied or otherwise provided to the destination hardware resources 118 while the application 104 continues to execute on a virtual machine 102. In other known techniques, such as the post-copy technique, the (transferred) virtual machine 112 begins executing along with the application 114, before a start or completion of the transfer of the memory pages 120, and then the memory pages 120 are subsequently transferred to the virtual machine 112 on an as-needed basis.

Figure 8:
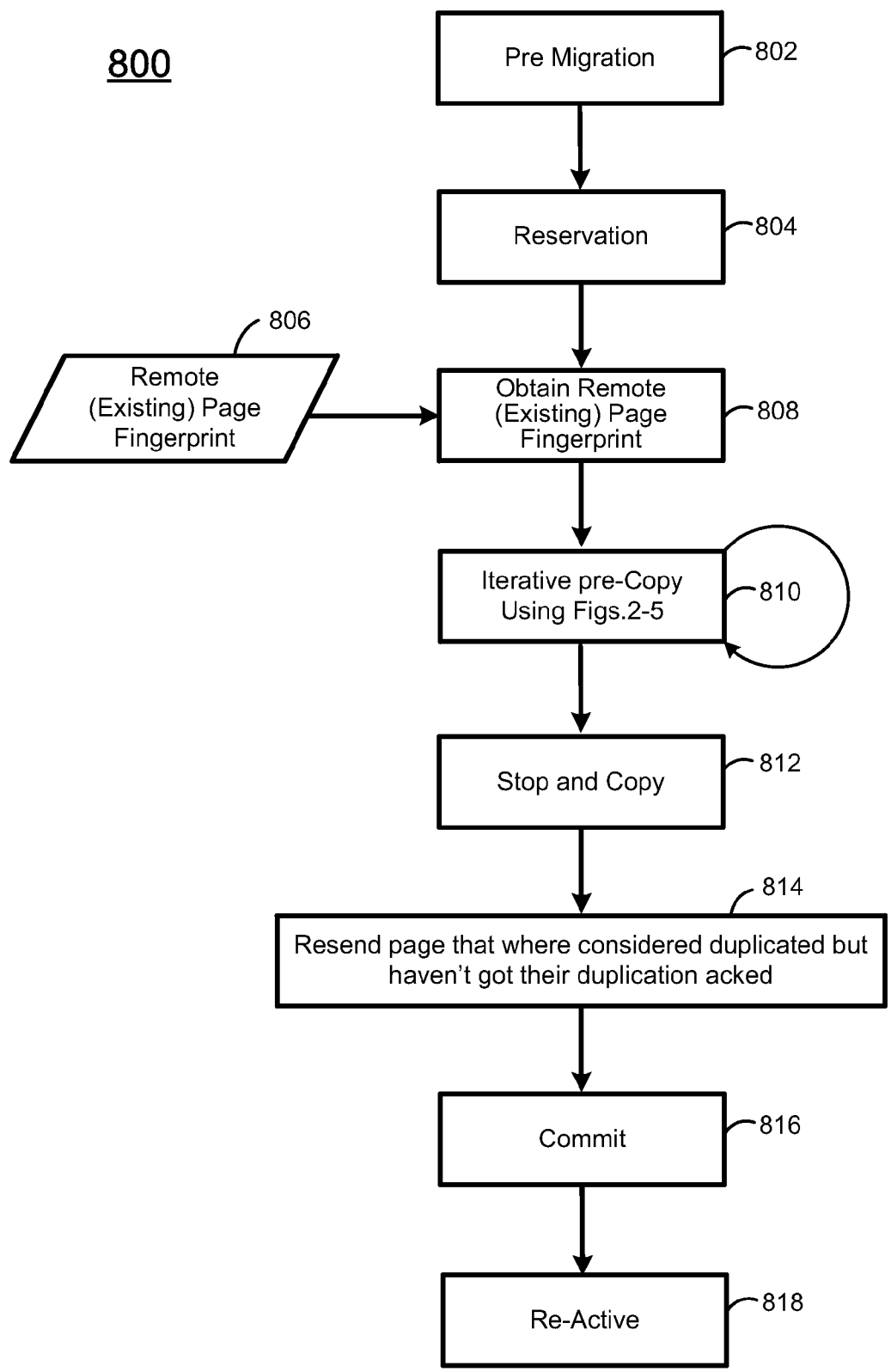
FIG. 8 is a flowchart illustrating an optimized pre-copy migration technique using the system of FIG. 1.
Figure 9:
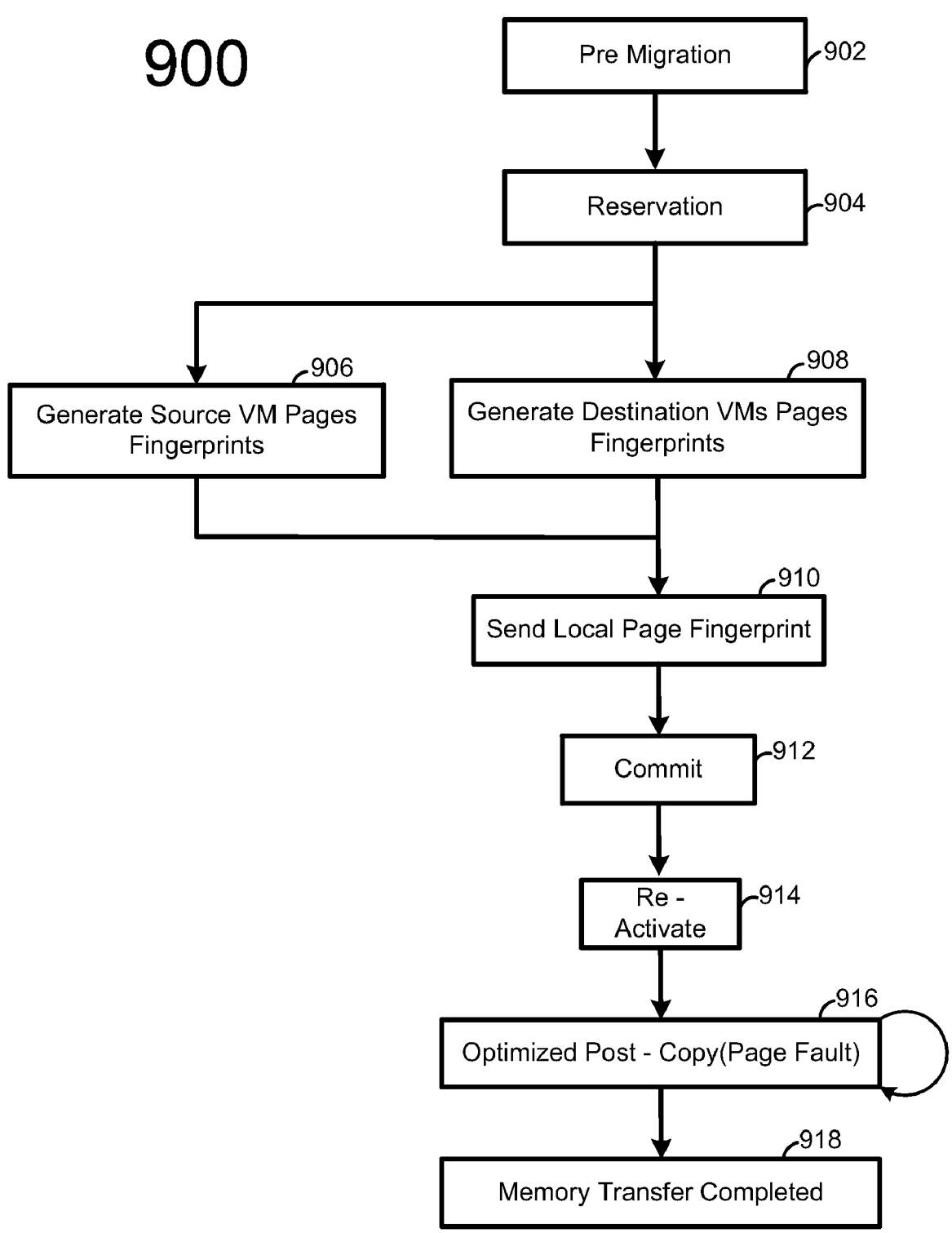
FIG. 9 is a flowchart illustrating an optimized post-copy migration technique for use with the system of FIG. 1.
Figure 10:
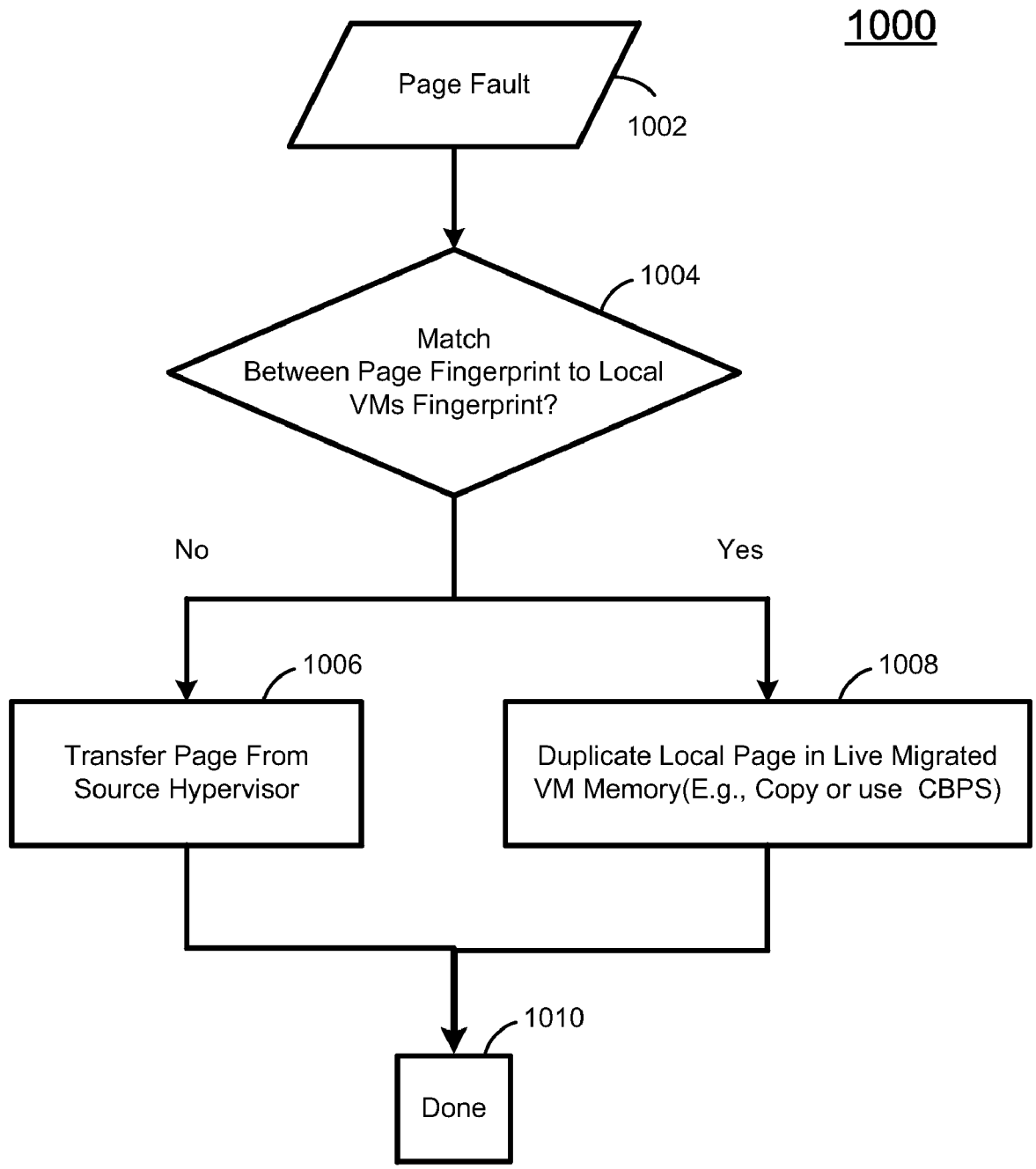
FIG. 10 is a flowchart illustrating an optimized page fault technique for use with the optimized post-copy technique of FIG. 9.

An example operation of a pre-copy technique is illustrated with respect to FIG. 8, while FIG. 9 illustrates example operations of a post-copy technique (where FIG. 10 illustrates additional detail regarding example operations of FIG. 9). However, it will be appreciated that the techniques of FIGS. 8 and 9 are non-limiting and merely for the sake of example, and that other techniques also may be used. For example, a desired mixture of pre-copy and post-copy techniques may be used to execute the live migration 110. For example, a pre-copy technique may initially be used, as in FIG. 8. Then, based on a repartition and priority changes of pages within the data structure 304, it may be determined whether some pages are continuously dirtied faster than the rate of copy/transfer. In this case, operations may continue to a stop-and-copy phase (e.g., 812, below), and/or may switch entirely to post-copy techniques (e.g., FIG. 9).

In the example of FIG. 8, a pre-copy technique may begin with pre-migration operations (802), in which, e.g., source hypervisor 106 indicates to the destination hypervisor 116 that a live migration is desired and will begin imminently. Subsequently, reservation operations (804) may begin at the destination hypervisor 116. For example, the destination hypervisor 116 may reserve an appropriate amount of the destination hardware resources 118 (e.g., an appropriate amount of processing and memory resources).

As referenced above, existing page fingerprints may be obtained (806) using one or more of a variety of techniques, several of which are referenced above in detail. For example, as described, the fingerprint generator 164 may generate existing page fingerprints 170 on an as-needed basis, or may generate the existing page fingerprint cache 172, or may use bloom filter 168 to generate existing page fingerprints bloom filter 174. Using one or more of these techniques, or other techniques, the source hypervisor 106, e.g., the fingerprint comparator 148, may obtain the existing page fingerprints (808).

At this point, the memory transfer manager 132 may execute an iterative and optimized pre-copy technique using, e.g., at least the operations of the flowcharts 200-500 of FIGS. 2-5 respectively. For example, as described, the various prioritization schemes may be used to identify appropriate memory pages for scanning and/or fingerprinting thereof at the source hypervisor 106, so that the described page transfer algorithm may be used to transfer the memory pages 120 or page fingerprints thereof.

Ideally, such pre-copy techniques would be sufficient to transfer all of the memory pages 120. In practice, however, it may occur that for a large amount of memory pages 120 and/or for frequent dirtying thereof, (e.g., large and/or frequent use of the application 104), it may be difficult or impossible to transfer all of the memory pages 120 before at least some of the memory pages 120 are dirtied or otherwise altered again. In such a case, it may become necessary or desirable to stop operations of the virtual machine 102 e.g., of the application 104, so that it becomes impossible for remaining ones of the memory pages 120 to be further dirtied or otherwise altered. In this case, a mass copying of any remaining memory pages may be made to the destination hardware resources 118 (812).

As part of such operations, or subsequent thereto, the memory transfer manager 132 may use information maintained by the acknowledgment manager 152 within the acknowledgement list 154 to determine memory pages which were fingerprinted for transfer within the live migration 110 but which were not acknowledged positively as having been received or available at the destination hardware resources 118 (814). For example, such operation (814) may refer to memory pages which were tracked within the wait list of the acknowledgement list 154 but which were never actually positively acknowledged as having been received, e.g., by the acknowledgement manager 162 at the destination hardware resources 118, so that the operations (814) may be considered to represent cleanup operations for any such memory pages, in which such memory pages are resent in order to be certain of their inclusion within the live migration 110. Subsequently, commit operations (816) may be executed in which an actual state of the processor and memory of the virtual machine 102 are captured and transferred to the destination hardware resources 118, whereupon the virtual machine 102 may be reactivated (818) as the virtual machine 112 for continued use thereof by users of the application 104/114 and other applications thereof.

FIG. 9 is an example of post-copy techniques, in which similar pre-migration (902) and reservation (904) operations may be initially executed, as described above with respect to FIG. 8. Subsequently, the memory pages 120, or subsets thereof, may be considered by the fingerprint generator 142 for generation of corresponding page fingerprints thereof. Similarly, existing page fingerprints at the destination hardware resources 118, or subsets thereof, also may be generated (908). As referenced above, during such post-copy techniques, the destination hardware resources 118 may begin executing the virtual machine 112 using available existing memory pages 124 of the application 114, if any are currently available, or to the extent such existing memory pages are currently available.

In this case, since an entirety of the memory pages 120 has not been transferred, it may eventually occur that the virtual machine 112, e.g., the application 114, may attempt to access a particular memory page which has not yet been transferred from the memory pages 120, which may be referred to as a page fault. In this case, a corresponding desired page fingerprint for the page in question may be identified and generated and sent to the memory transfer manager 132 of the source hypervisor 106. Use of such local page fingerprint is described in more detail below, with respect to FIG. 10, but in general, it may be appreciated that the local page fingerprint may be utilized in determining whether it is necessary to transfer corresponding memory page from the source hardware resources 108, or whether a corresponding duplicate page is available at the destination hardware resources 118. Once the local page fingerprint(s) have been sent (910), then commit (912) and reactivation (914) operations may be executed, similarly to that described above, with respect to FIG. 8.

At this point, an optimized post-copy technique may be used based on the page prioritization and transfer techniques of at least FIGS. 2-5 above (916), in which each time the page fault occurs and thereby indicates that a desired memory page is not available at the virtual machine 112. Then, corresponding memory page(s) may be accessed from, or otherwise used by, the destination hardware resources 118. The post-copy operations (916) may continue iteratively until all desired or necessary memory pages of the memory pages 120 have been transferred or otherwise obtained, whereupon the memory transfer may be considered completed (918).

As referenced above, FIG. 10 illustrates example operations of the page fault operations (916) of FIG. 9. More specifically, upon determination of the page fault (1002), a determination may be made as to whether a match exists between a page fingerprint in question and existing page fingerprints at the destination hardware resources 118 (1004). If there is no match, then the memory page in question may be transferred from the source hypervisor 106 (1006). On the other hand, if a match does exist, then the corresponding duplicate candidate page may be utilized at the currently live and running virtual machine 112 (1008). For example, the identified duplicate candidate page may be copied or may be accessed using content based page sharing, as referenced above. In either case, the page fault operations of FIG. 10 may then be completed (1010), unless and until a subsequent page fault occurs.

Various additional or alternative embodiments may be implemented. For example, when executing the page priority schemes of FIGS. 3A, 3B, and 4, it is described above that a conventional dirty page tracking operation may be leveraged, e.g., the page priority schemes may be inserted during the conventional dirty page tracking operation. In other examples, the page priority schemes may be inserted during an iterative pre-copy memory scan for the dirty pages to be transferred. In the page priority schemes, the dirty bit and/or priority level may be checked rapidly in the described schemes, e.g., using a simple Exclusive OR (XOR) operation. Other techniques may be used, as well.

Further, various modifications may be made with respect to the structure of the data structure 304, e.g., to reduce its memory footprint. For example, a depth of the structure 304 may be modified by changing the number of priority levels. Further, the data structure may be made dynamic by spawning or deleting priority levels based on a threshold level of bits set for a particular level. In other examples, a width of the data structure 304 may be altered. For example, a single bit may represent a cluster or set of pages (e.g., 1 bit is equivalent to 4 pages). In a final example, the layered bitmap structure 304 may be replaced using, e.g., a layered counting bloom filter structure.

During an initial iteration of a pre-copy phase, or at certain points thereafter, the data structure 304 may be seeded or updated with a random bit set distribution. Additionally, or alternatively, the page priority fingerprinting order may be randomly pre-seeded. In this way (or by similar techniques), the iterative learning process of the data structure 304 may be accelerated. In potentially related implementations, an intelligent decision may be made as to whether and how to execute fingerprinting of candidate memory pages of the memory pages 120. That is, for example, the priority checker 144 may follow the recognition that there may be little use in fingerprinting a given page if that page is likely to be dirtied in the near future, so that fingerprinting may only occur for high priority pages.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a computer-readable medium, the system comprising:
    a page scanner configured to identify, during a live migration of a virtual machine including a transfer of a plurality of memory pages from source hardware resources to destination hardware resources, a candidate memory page of the plurality of memory pages to include in the transfer while at least one operation of the virtual machine continues to execute;

a priority manager configured to determine a priority level of the candidate memory page for use by the page scanner in selecting the candidate memory page from the plurality of memory pages;

a fingerprint generator configured to determine, during the live migration, whether to generate a fingerprint for the candidate memory page based on the determined priority level, and at a time when the fingerprint generator determines to generate the fingerprint, the fingerprint generator is configured to generate a candidate page fingerprint of the candidate memory page, based on the identifying of the candidate memory page by the page scanner during the live migration;

a fingerprint comparator configured to compare the candidate page fingerprint of the candidate memory page to existing page fingerprints of existing memory pages stored using the destination hardware resources, and further configured to determine, based on the comparing, that a duplicate of the candidate page is included within the existing memory pages; and a duplicate page handler configured to facilitate continued execution of the virtual machine using the duplicate of the candidate page and the destination hardware resources.

2. The system of claim 1 wherein the priority manager is configured to determine the priority level based on a frequency with which the candidate memory page is altered during the live migration.

3. The system of claim 1 wherein the priority manager maintains a two-dimensional data structure in which each row corresponds to a defined priority level and each column corresponds to a memory page of the plurality of memory pages, and in which each memory page of the plurality of memory pages is identified as having been altered or not since a most-recent transfer thereof, and further wherein the page scanner is configured to scan the plurality of memory pages to select the candidate memory page including selecting the priority level associated with the candidate memory page and determining that the candidate memory page has been altered since a most-recent transfer thereof.

4. The system of claim 1 wherein the fingerprint comparator is configured to compare the candidate page fingerprint of the candidate memory page to existing page fingerprints including maintaining an existing fingerprints cache representing the existing page fingerprints at a point in time, and comparing the candidate page fingerprint thereto.

5. The system of claim 1 wherein the fingerprint comparator is configured to compare the candidate page fingerprint of the candidate memory page to existing page fingerprints including comparing a bloom filter representation of the candidate page fingerprint to a bloom filter representation of the existing page fingerprints.

6. The system of claim 1 wherein the fingerprint comparator is configured to execute using the destination hardware resources, and wherein the existing page fingerprints are generated and stored at the destination hardware resources for comparison of the candidate page fingerprint thereto.

7. The system of claim 1 wherein the fingerprint comparator is configured to compare a second candidate page fingerprint of a second candidate memory page to the existing page fingerprints of existing memory pages stored using the destination hardware resources, and further configured to determine, based on the comparing, that a duplicate of the second candidate page is included within the existing memory pages, wherein the system further comprises an acknowledgment manager configured to determine that the duplicate of the second candidate page is not included within the existing memory pages, and wherein the system is configured to thereafter transfer contents of the second candidate memory page in place of the second candidate page fingerprint.

8. The system of claim 1 wherein the fingerprint comparator is configured to compare a second candidate page fingerprint of a second candidate memory page to the existing page fingerprints of existing memory pages stored using the destination hardware resources, and further configured to determine, based on the comparing, that no duplicate of the second candidate page is included within the existing memory pages, wherein the system is configured to thereafter transfer contents of the second candidate memory page in place of the second candidate page fingerprint.

9. The system of claim 1 wherein the duplicate page handler is configured to facilitate continued execution of the virtual machine using the duplicate of the candidate page and the destination hardware resources including implementing a content-based page sharing (CBPS) technique.

10. A computer-implemented method comprising:

executing a live migration of a virtual machine including a plurality of memory pages from source hardware resources to destination hardware resources, the live migration including transfer of the virtual machine from the source hardware resources to the destination hardware resources while continuing to execute at least one operation of the virtual machine;

identifying during the live migration, a candidate memory page of the plurality of memory pages to include in the transfer including determining a priority level of the candidate memory page for use in selecting the candidate memory page from the plurality of memory pages;

determining, during the live migration, whether to generate a fingerprint for the candidate memory page based on the determined priority level;

generating, at a time when the determining determines to generate the fingerprint, a candidate page fingerprint of the candidate memory page, based on the identifying of the candidate memory page during the live migration;

comparing the candidate page fingerprint of the candidate memory page to existing page fingerprints of existing memory pages stored using the destination hardware resources;

determining, based on the comparing, that a duplicate of the candidate page is included within the existing memory pages; and executing the virtual machine using the duplicate of the candidate page and the destination hardware resources.

11. The method of claim 10 wherein the determining a priority level of the candidate memory page includes determining the priority level based on a frequency with which the candidate memory page is altered during the live migration.

12. The method of claim 10 wherein the comparing the candidate page fingerprint of the candidate memory page to existing page fingerprints comprises:

maintaining an existing fingerprints cache representing the existing page fingerprints at a point in time; and comparing the candidate page fingerprint thereto.

13. The method of claim 10 wherein the comparing the candidate page fingerprint of the candidate memory page to existing page fingerprints comprises:

comparing a bloom filter representation of the candidate page fingerprint to a bloom filter representation of the existing page fingerprints.

14. The method of claim 10 comprising:

comparing a second candidate page fingerprint of a second candidate memory page to the existing page fingerprints of existing memory pages stored using the destination hardware resources;

determining, based on the comparing, that no duplicate of the second candidate page is included within the existing memory pages; and transferring contents of the second candidate memory page in place of the second candidate page fingerprint.

15. A computer program product, the computer program product being tangibly embodied on a computer-readable medium and comprising instructions that, when executed, are configured to:

identify, during a live migration of a virtual machine including a transfer of a plurality of memory pages from source hardware resources to destination hardware resources, a candidate memory page of the plurality of memory pages to include in the transfer while at least one operation of the virtual machine continues to execute;

determine a priority level of the candidate memory page for use in selecting the candidate memory page from the plurality of memory pages;

determine, during the live migration, whether to generate a fingerprint for the candidate memory page based on the determined priority level;

generate, at a time when determined to generate the fingerprint, a candidate page fingerprint of the candidate memory page, based on the identifying of the candidate memory page during the live migration;

compare the candidate page fingerprint of the candidate memory page to existing page fingerprints of existing memory pages stored using the destination hardware resources;

determine, based on the comparing, that a duplicate of the candidate page is included within the existing memory pages; and facilitate continued execution of the virtual machine using the duplicate of the candidate page and the destination hardware resources.

16. The computer program product of claim 15 wherein the instructions, when executed, are configured to:

determine the priority level of the candidate memory page based on a frequency with which the candidate memory page is altered during the live migration.

17. The computer program product of claim 15 wherein the instructions, when executed, are configured to:

compare a bloom filter representation of the candidate page fingerprint to a bloom filter representation of the existing page fingerprints.

18. The computer program product of claim 15 wherein the instructions, when executed, are configured to:

compare a second candidate page fingerprint of a second candidate memory page to the existing page fingerprints of existing memory pages stored using the destination hardware resources;

determine, based on the comparing, that no duplicate of the second candidate page is included within the existing memory pages; and transfer contents of the second candidate memory page in place of the second candidate page fingerprint.

* * * * *